(12) United States Patent
Franzen et al.

(10) Patent No.: US 6,584,248 B2
(45) Date of Patent: Jun. 24, 2003

(54) TEMPERATURE-COMPENSATED OPTICAL GRATING DEVICE

(75) Inventors: David S. Franzen, Painted Post, NY (US); Walter L. Morgan, Painted Post, NY (US); Jackson P. Trentelman, Lawrenceville, PA (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/974,501

(22) Filed: Oct. 9, 2001

(65) Prior Publication Data

US 2003/0068127 A1 Apr. 10, 2003

(51) Int. Cl.[7] .................................................. G02B 6/34
(52) U.S. Cl. ............................. 385/37; 385/99; 385/136
(58) Field of Search ............................... 385/10, 37, 99, 385/136, 137

(56) References Cited

U.S. PATENT DOCUMENTS

| | | | |
|---|---|---|---|
| 5,042,898 A | 8/1991 | Morey et al. | 385/37 |
| 5,757,540 A | 5/1998 | Judkins et al. | 359/341 |
| 5,914,972 A | 6/1999 | Siala et al. | 372/33 |
| 5,970,194 A | 10/1999 | Dunn et al. | 385/95 |
| 5,991,483 A | 11/1999 | Engelberth | 385/37 |
| 6,044,189 A | 3/2000 | Miller | 385/37 |
| 6,101,301 A | 8/2000 | Engelberth et al. | 385/37 |
| 6,181,851 B1 * | 1/2001 | Pan et al. | 385/37 |
| 6,393,181 B1 * | 5/2002 | Bulman et al. | 385/37 |

OTHER PUBLICATIONS

Yoder, Jr., Paul R. Mounting Lenses In Optical Instruments:; Tutorial Tests in Optical Engineering, vol. TT 21, SPIE Optical Engineering Press pp 72–73. (No date).

Yoffe, G.W. Krug, P.A., et al. Passive Temperature–Compensating Package For Optical Fiber Gratings:, Applied Optics, vol. 34, No. 30 Oct. 20, 1995 pp 6859–6861.

* cited by examiner

*Primary Examiner*—John D. Lee
(74) *Attorney, Agent, or Firm*—Eric M. Smith; Svetlana Z. Short

(57) ABSTRACT

An improved temperature-compensated optical grating device includes a temperature-compensating structure including a plurality of members that are selected and arranged to provide an effective coefficient of thermal expansion that is negative with respect to two mounting points for an optical fiber grating, wherein the improvement is achieved by making at least one of the members of the temperature-compensating structure from a material having a low coefficient of thermal expansion that decreases with increasing temperature and at least one other member having a high coefficient of thermal expansion that increases with increasing temperature.

40 Claims, 10 Drawing Sheets

TEMPERATURE-COMPENSATED OPTICAL GRATING DEVICE

BACKGROUND OF THE INVENTION

1. Field of the Invention

The present invention relates to optical fiber gratings, and in particular to an improved temperature-compensating structure for optical fiber gratings.

2. Technical Background

Optical fiber gratings are important elements for selectively controlling specific wavelengths of light within an optical fiber. Such gratings include fiber Bragg gratings and long-period gratings.

Fiber Bragg gratings are optical waveguide fiber devices that selectively reflect specific wavelengths of light propagating in an optical waveguide fiber. Fiber Bragg gratings consist of a plurality of perturbations in the index of refraction spaced along the fiber length. These perturbations selectively reflect light of wavelength $\lambda$ equal to twice the spacing $\Lambda$ between successive perturbations times the effective refractive index, i.e., $\lambda = 2n_{eff}\Lambda$, where $\lambda$ is the vacuum wavelength and $n_{eff}$ is the effective refractive index of the propagating mode. The remaining wavelengths pass essentially unimpeded. Such Bragg gratings have found use in a variety of applications including filtering, stabilization of semiconductor lasers, reflection of fiber amplifier pump energy, and compensation for fiber dispersion.

Long-period fiber grating devices provide wavelength dependent loss and may be used for spectral shaping. A long-period grating couples optical power between two copropagating modes with very low back reflections. A long-period grating typically comprises a length of optical fiber wherein a plurality of refractive index perturbations are spaced along the fiber by a periodic distance $\Lambda'$ which is large compared to the wavelength $\lambda$ of the transmitted light. In contrast, with conventional Bragg gratings, long-period gratings use a periodic spacing $\Lambda'$ which is typically at least 10 times larger than the transmitted wavelength, i.e., $\Lambda' > 10\lambda$. Typically, $\Lambda'$ is in the range of 15–1500 micrometers, and the width of a perturbation is in the range of $\frac{1}{5}\Lambda'$ to $\frac{4}{5}\Lambda'$. In some applications, such as chirped gratings, the spacing $\Lambda'$ can vary along the length of the grating.

Long-period fiber grating devices selectively remove light at specific wavelengths by mode conversion. In contrast, with conventional Bragg gratings in which light is reflected and stays in the fiber core, long-period gratings remove light without reflection by converting it from a guided mode to a non-guided mode. A non-guided mode is a mode which is not confined to the core, but rather, is defined by the entire waveguide structure. The spacing $\Lambda'$ of the perturbations is chosen to shift transmitted light in the region of a selected peak wavelength $\lambda_p$ from a guided mode into a non-guided mode, thereby reducing in intensity a band of light centered about the peak wavelength $\lambda_p$. Alternatively, the periodicity $\Lambda'$ of the long-period fiber grating may be chosen to shift light from one guided mode to a second guided mode (typically a higher order mode) which is substantially stripped off the fiber to provide a wavelength dependent loss. Such devices are particularly useful for equalizing amplifier gain at different wavelengths of an optical communication system.

In Bragg gratings, both $n_{eff}$ and $\Lambda$ are temperature dependent, with a net temperature dependence for a grating in a silica-based fiber typically having an average value of about 0.0115 nanometers per degree C at a wavelength of 1550 nanometers over the temperature range of interest in optical communication systems. It should be noted that temperature dependence is nonlinear. The temperature-induced shift in the reflection wavelength typically is primarily due to the change in $n_{eff}$ with temperature. The thermal expansion-induced change in $\Lambda$ is responsible for only a small fraction of the net temperature dependence of a grating in a conventional silica-based fiber.

Similarly, long-period gratings also exhibit high temperature sensitivity. The peak wavelength $\lambda_p$ shifts by 5–15 nanometers per 100° C. change in temperature. This sensitivity is about 5 times higher than for fiber Bragg gratings. Over the ambient temperature range experienced by optical communication systems such variation is not acceptable.

Accordingly, various methods have been devised for compensating for the undesirable performance effects caused by ambient temperature fluctuations. Thermoelectric heaters/coolers may be used for maintaining the optical grating at a desired temperature to prevent temperature-induced shifts in operating wavelength. However, active temperature control using heaters/coolers is expensive, and often impractical. Accordingly, passive temperature compensation techniques are highly desirable.

Various passive temperature-compensating structures have been devised that regulate the amount of tension on the portion of an optical fiber containing an optical grating to compensate for changes in the temperature of the optical grating.

One method of achieving passive temperature compensation employs tension adjustment of the portion of the optical fiber containing the optical grating. This method involves fixing the fiber to a substrate material having a negative coefficient of thermal expansion, such as β-eucryptite. As the temperature increases, the substrate contracts thereby maintaining the reflective wavelength of the grating. A disadvantage with this technique is that β-eucryptite requires hermetic packaging in order to function reliably over the range of environmental conditions specified for optical communication systems. Another disadvantage is that the hermetically sealed negative expansion substrate package is undesirably large.

Another method of passive temperature compensation utilizes materials of dissimilar thermal expansion characteristics to form a composite substrate to which the fiber grating is attached. Typically, the fiber is attached to the substrate at two points, with the grating located between the two attachment points. Because of the differences in thermal expansion of the two dissimilar materials, the layered composite substrate bends and the distance between the two attachment points decreases as temperature increases, thereby reducing the strain of the grating and thus compensating for the temperature-induced changes in the optical characteristics of the grating.

Another method that utilizes adjustment of the tension on an optical fiber containing an optical grating uses a mounting device comprising an arrangement of two materials of greatly differing coefficients of thermal expansion. The fiber is mounted to the device so that the amount of tension on the fiber decreases as temperature increases. Thus, the thermal expansion and thermally induced refractive index change of the grating are compensated for by the release in fiber strain.

A problem with the known temperature-compensating devices employing members made of materials having different coefficients of thermal expansion to provide a mounting having an effective coefficient of thermal expansion that is negative, whereby tension on a fiber mounted to the device is relieved with increasing temperature, is that the temperature-compensating effect does not provide a truly athermalized grating (i.e., the optical characteristics of the grating are temperature independent). Instead, the temperature- compensated gratings exhibit a center wavelength shift at most temperatures, that can range up to about 30 to 50 picometers. It is anticipated that future performance requirements of optical communication systems will require substantially improved athermalization for passively temperature-compensated optical fiber gratings.

SUMMARY OF THE INVENTION

It has been discovered that improved temperature compensation for an optical grating can be achieved using a temperature-compensating structure comprising a plurality of members that are selected and arranged to provide an effective coefficient of thermal expansion that is increasingly negative with increasing temperature with respect to two mounting points for an optical fiber grating. The improved performance is achieved by using a temperature-compensating structure wherein at least one of the members has a coefficient of thermal expansion that increases with increasing temperature and is higher than the coefficient of thermal expansion of at least one other member which has a coefficient of thermal expansion that decreases with increasing temperature.

Additional features and advantages of the invention will be set forth in the detailed description which follows and will be apparent to those skilled in the art from the description or recognized by practicing the invention as described in the description which follows together with the claims and appended drawings.

It is to be understood that the foregoing description is exemplary of the invention only and is intended to provide an overview for the understanding of the nature and character of the invention as it is defined by the claims. The accompanying drawings are included to provide a further understanding of the invention and are incorporated and constitute part of this specification. The drawings illustrate various features and embodiments of the invention which, together with their description serve to explain the principals and operation of the invention.

DETAILED DESCRIPTION OF THE PREFERRED EMBODIMENTS

The principles of this invention are applicable to generally any structure employing at least two members having different coefficients of thermal expansion and which are arranged so that the structure has an effective coefficient of thermal expansion that is negative with respect to two mounting points. Examples of such devices are illustrated schematically in FIGS. 1 and 3.

Figure 1:
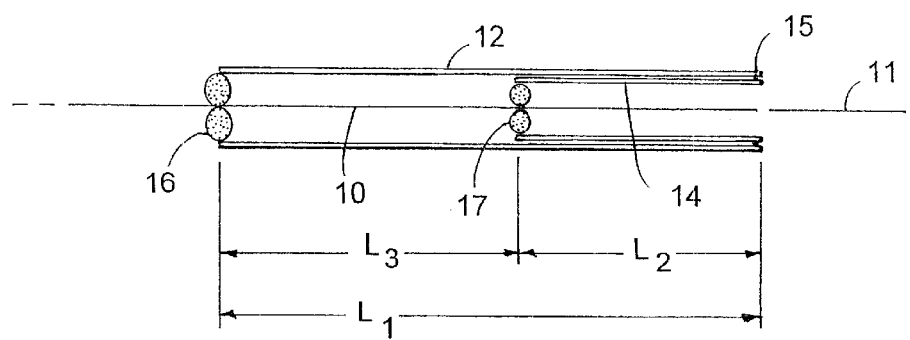
FIG. 1 is a cross-sectional schematic representation of a temperature-compensated optical fiber grating employing a temperature-compensating structure comprising two concentric tubular members arranged to provide an effective coefficient of thermal expansion that is negative.

In FIG. 1, there is shown a two member temperature-compensating structure for adjusting the tension on a portion 10 of an optical fiber 11 containing an optical grating. The temperature-compensating device comprises a first cylindrical member 12 and a second cylindrical member 14. Members 12 and 14 are joined together at location 15 which may extend circumferentially around an annular gap between cylindrical members 12 and 14. Any of various techniques well known in the art may be used for joining member 12 and member 14 at location 15. Examples of suitable bonding techniques include adhesive bonding, brazing, soldering and welding. An end of member 12 opposite the end that is joined to member 14 at location 15 is fixed to fiber 11 by suitable means 16, and an end of member 14 opposite the end fixed to member 12 at location 15 is fixed to fiber 11 by means 17. Suitable means for attaching members 12 and 14 to fiber 11 include use of adhesives, glass frits and solder. Specific and preferred means for attaching members 12 and 14 to an optical fiber and to each other are described in detail in copending U.S. patent application Ser. No. 09/748,032 filed on Dec. 22, 2000, (U.S. Pat. No. 6,453,092) the entire content of which is incorporated herein by reference. The optical grating (either a fiber Bragg grating or a long-period grating) is defined in the portion 10 of fiber 11 located between joining means 16 and 17.

During assembly of the temperature-compensated optical grating device shown in FIG. 1, portion 10 of fiber 11 may be stretched and pre-tensioned.

The materials and dimensions for members 12 and 14 are selected so that the temperature-compensating structure has an overall or effective coefficient of thermal expansion that is negative with respect to the attachment points at joining means 16 and 17. In the device illustrated in FIG. 1, member 12 has a coefficient of thermal expansion that is lower than the coefficient of thermal expansion of member 14, with the lengths of members 12 and 14 being selected so that the change in length of member 14 for a given temperature change is greater than the change in length of member 12, whereby tension in portion 10 of fiber 11 is reduced as temperature increases, and tension on portion 10 of fiber 11 increases as temperature decreases. Assuming that the coefficients of thermal expansion for members 12 and 14 are temperature independent, the coefficients of thermal expansion and lengths required to cancel the temperature effect can be calculated as follows:

The free space Bragg wavelength is given by:

$$\lambda = 2n_{eff}\Lambda$$

where $n_{eff}$ is the effective refractive index of the perturbed region of the fiber core 11 and $\Lambda$ is the spacing of the Bragg grating filter element. The change in Bragg wavelength for a temperature change $\Delta T$ from ambient temperature is then given by $$\Delta\lambda/\lambda = (\alpha_f + \zeta)\Delta T + (1-\rho_e)\Delta\epsilon$$

where $\alpha_f$ is the thermal expansion coefficient of the fiber 10, $\Delta\epsilon$ is the change in the strain with temperature, $\Delta T$ is the change in temperature, $\zeta$ is the thermo-optic coefficient for the fiber material, and $\rho_e$ the photoelastic constant. These last two quantities are related to the change in index by $$\zeta = 1/n \, dn/dT; \quad \rho_e = 1/n \, dn/d\epsilon$$

Referring once more to FIG. 1, the change in length of the fiber portion 10 is given by $$\Delta L_3 = \Delta T(\alpha_1 L_1 - \alpha_2 L_2)$$

where $\alpha_1 L_1$ and $\alpha_2 L_2$ correspond to the length changes of members 12 and 14, and $\Delta L_3$ corresponds to the length change of grating 10. By replacing $\Delta\epsilon$ with $\Delta L_3$ the normalized wavelength change per unit temperature change is given in terms of the length changes by the expression $$\Delta\lambda/\lambda \cdot 1/\Delta T = \alpha_f + \zeta + (1-\rho_e)(\alpha_1 L_1 - \alpha_2 L_2)$$

Figure 2:
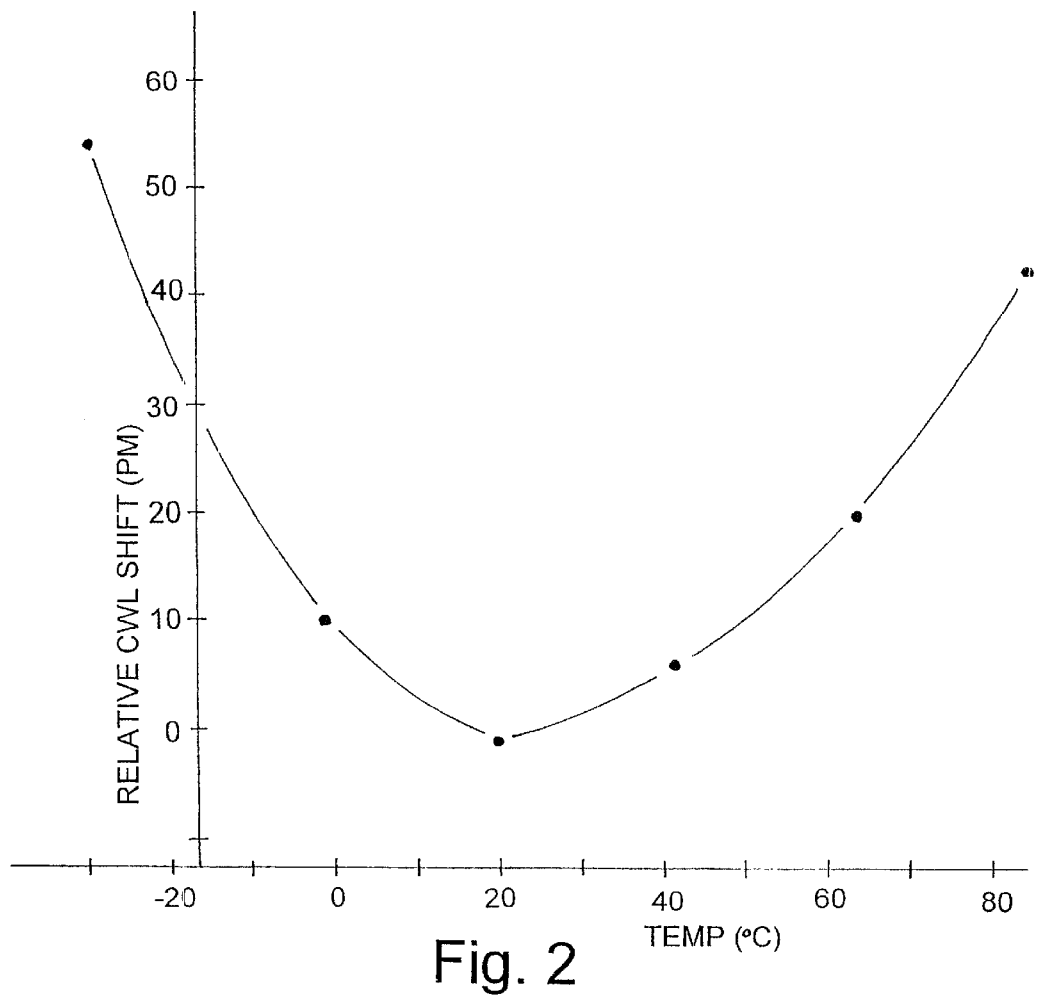
FIG. 2 is a graph of the center wavelength shift verses temperature for a conventional temperature-compensated fiber Bragg grating (such as is shown in FIG. 1).

Most commonly employed engineering materials, including aluminum and stainless steel, have the basic characteristic that the coefficient of thermal expansion increases with temperature. Other commonly used materials that exhibit a coefficient of thermal expansion that increases with temperature include metals such as Invar®, brass, cast iron, inconel, and most glasses and ceramics. Fabricating any temperature-compensating structure from a combination of high expansion and low expansion members of this group will produce the predictable result that the increase in coefficient of thermal expansion of each member will largely cancel out that of the other member and produce a device with an essentially constant effective or overall coefficient of thermal expansion. However, it has been found that the materials that have heretofore been used for constructing such devices do not completely compensate for center wavelength shifts that occur as a result of temperature changes. In particular, known temperature-compensating structures constructed from members having different thermal expansion coefficients typically have a coefficient of thermal expansion (CTE) that is relatively constant (e.g., about $-75 \times 10^{-7}$ °C.$^{-1}$). With these known devices there is a residual center wavelength shift with temperature. FIG. 2 illustrates this residual effect for a fiber under tension over the temperature range of $-30$° C. to 85° C. The total effect typically exceeds 50 picometers.

Since, in practical terms, the choice of low expansion materials is quite narrow (Invar® is usually selected since it has the lowest coefficient of thermal expansion over at least a restricted temperature range), the above described residual effect is usually tolerated and considered part of the design limitation. To compensate accurately over the full range of interest (e.g., from about $-40$° C. to about 85° C.) requires an overall or effective coefficient of thermal expansion that varies from about $-60 \times 10^{-7}$ per ° C. at $-40$° C. to about $-90 \times 10^{-7}$ per ° C. at 85° C. Without this variable effective coefficient of thermal expansion, an optical grating will typically exhibit the parabolic response shown in FIG. 2, with a variation in center wavelength shift of from about 50 to 70 picometers over the $-40$° C. to 85° C. temperature range. The invention may be beneficially employed to reduce the residual variation to less than 5 picometers over the $-40$ C to 85° C. temperature range.

In accordance with the principles of this invention, a judicious selection of materials, assembled in an appropriate combination, is used to produce a device with an effective coefficient of thermal expansion that varies with temperature to completely offset both the linear and non-linear effects of temperature change on center wavelength shift in an optical fiber grating. Instead of utilizing temperature-compensating members having different coefficients of thermal expansion that increase with increasing temperature, the invention utilizes at least one member made of a material having a coefficient of thermal expansion that increases with temperature and another member having a lower coefficient of thermal expansion which decreases with increasing temperature by an appropriate amount. Appropriate materials are not commonly known and have not been employed in known temperature-compensating structures for optical fiber gratings. This is partially attributable to the fact that the coefficient of thermal expansion data available for many alloys is incomplete and sometimes unreliable, and in part because very few materials actually have a coefficient of thermal expansion that decreases as temperature increases over the temperature range of interest.

In accordance with an aspect of this invention, a temperature-compensated optical fiber grating is achieved using a temperature-compensating structure having an effective coefficient of thermal expansion that decreases with increasing temperature to compensate for the residual non-linear center wavelength shift with temperature associated with conventional temperature-compensating structures having an effective coefficient of thermal expansion that is substantially constant over the temperature range of interest (e.g., $-40$° C. to 85° C.). A temperature-compensating structure exhibiting a variable effective coefficient of thermal expansion that decreases with temperature from about −60×10⁻⁷° C. at −40° C. to about −90×10⁻⁷° C.⁻¹ at 85° C. can be achieved with a first temperature-compensating member having a coefficient of thermal expansion that decreases with increasing temperature and which is relatively low (e.g., less than 50×10⁻⁷° C.⁻¹) over the temperature range from −40° C. to 85° C., and a second temperature-compensating member having a coefficient of thermal expansion that increases with increasing temperature and is relatively high (e.g., greater than 100×10⁻⁷⁰° C.⁻¹) over the temperature range from −40 to 85° C. Kovar® and Alloy 42 are materials having a coefficient of thermal expansion that is less than 50×10⁻⁷° C.⁻¹ over the temperature range from −40 to 85° C. and which decreases with increasing temperature. Materials having a coefficient of thermal expansion that is greater than 100×10⁻⁷° C.⁻¹ and which increase with increasing temperature include brass, 304 stainless steel and 309 stainless steel. However, 309 stainless steel is preferred because it has a coefficient of thermal expansion that is more constant than brass or 304 stainless steel over most of the temperature range of interest.

Two materials having a low coefficient of thermal expansion which actually decreases with temperature over the range of interest are Kovar® and Alloy 42 (Alloy 42 is a low expansion iron-based alloy with about 42 weight percent nickel and about 58 weight percent iron) normally employed in glass to metal sealing applications. The coefficient of thermal expansion of Kovar® is relatively low, but Kovar® is difficult to machine into useful shapes for this application. Alloy 42 is a more useful material for this application. Alloy 42 has a coefficient of thermal expansion intermediate between Invar® and Kovar® and is more readily machined than Kovar®. Alloy 42 is also available as progressively stamped shapes or in tubing form.

Figure 3:
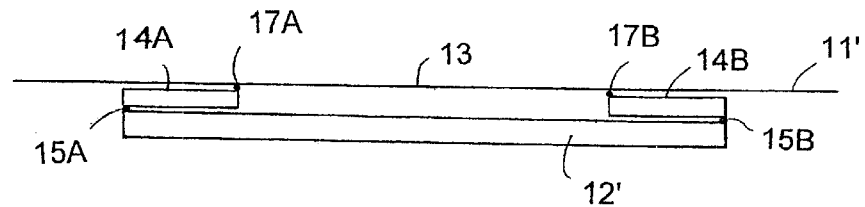
FIG. 3 is a schematic representation of a thermally compensated fiber optical grating employing a temperature-compensating structure comprising a first member having a coefficient of thermal expansion that decreases with increasing temperature and a second and third member which each have a coefficient of thermal expansion that is higher than the coefficient of thermal expansion of the first member.

FIG. 3 schematically illustrates an alternative temperature-compensating structure comprising a first member 13 joined to a second member 14A by joining means 15A and also joined to a third member 14B by joining means 15B. Members 14A and 14B have coefficients of thermal expansion that are higher than the coefficient of thermal expansion for member 12'. Typically, the coefficient of thermal expansion for members 14A and 14B are equal. Members 14A and 14B are joined at spaced apart points 17A and 17B. Elongated section 13 of optical fiber 11' extends linearly between joints 17A and 17B and contains an optical fiber grating (e.g., either a fiber Bragg grating or a long-period grating). Members 12', 14A and 14B are arranged to define a temperature-compensating structure having an effective or overall coefficient of thermal expansion that is negative with respect to the points 17A and 17B where fiber 11' is fixed to members 14A and 14B respectively. Tension on section 13 of optical fiber 11' decreases as temperature increases, and increases as temperature decreases, whereby the temperature effect on the center wavelength shift is offset by the effect of tensile strain on the center wavelength shift.

The structure shown in FIG. 3 is functionally equivalent to the structure shown in FIG. 1, except that the material having a higher coefficient of thermal expansion has been divided into two separate members 14A and 14B. Accordingly, the same mathematical model can be used for the structure of FIG. 3 that was used for FIG. 1, except that $L_2$ is the combined length of members 14A and 14B. The device is similar to known temperature- compensating devices except that the member made of a material having a lower coefficient of thermal expansion (i.e., member 12') is selected to have a coefficient of thermal expansion that decreases with increasing temperature, in order to offset or compensate for the non-linear residual effects of center wavelength shift as a function of temperature. The resulting device is capable of exhibiting a variation in center wavelength shift of less than 5 picometers over a temperature range from −40° C. to 85° C.

Figure 4:
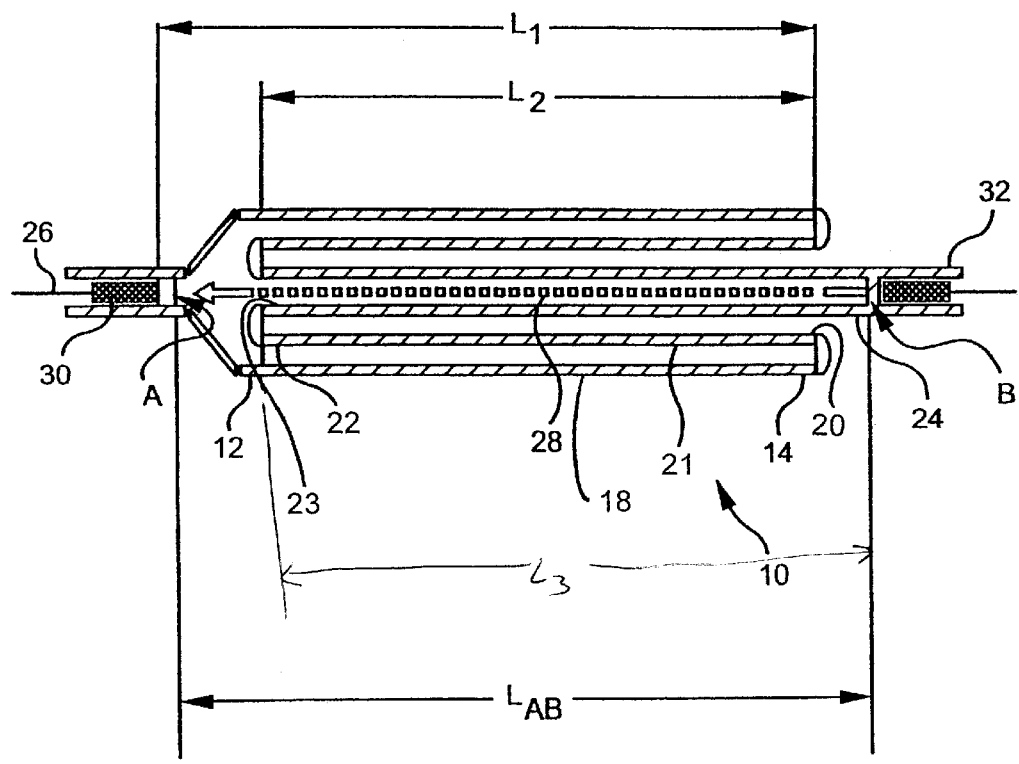
FIG. 4 is a cross-sectional view of a temperature-compensated optical device according to another embodiment of the present invention.

An example of another temperature-compensating structure is shown in FIG. 4. The temperature-compensating structure includes a first tubular member 18. One end 14 of the first tubular member 18 is coupled to one end 20 of a second tubular member 21. The end 14 of the first tubular member 18 may be coupled to the end 20 of the second tubular member 21 by adhesive bonding, brazing, soldering or welding.

The other end 22 of the second tubular member 21 is coupled to one end 23 of a third tubular member 24. The end 22 of the second tubular member 21 may be coupled to the end 23 of the third tubular member 24 by adhesive bonding, brazing, soldering or welding.

An optical waveguide fiber 26 having fiber grating region 28 is coupled to the end 30 of the first tubular member 18 at point A and to the end 32 of the third tubular member 24 at point B. Preferably, the fiber grating (e.g., fiber Bragg grating or long-period fiber grating) region 28 is tensioned so that the grating region 28 reflects or selectively removes optical signals having a selected waveband. Tensioning the fiber-grating region 28 changes the periodicity of the grating, thus enabling the center wavelength of the reflected waveband to be modified. The fiber-grating region 28 of the optical waveguide fiber 26 is located between point A and point B. The optical waveguide fiber 26 may be coupled to the end 30 of the first tubular member 18 and the end 32 of the third fiber 26 is located between point A and point B. The optical waveguide fiber 26 maybe coupled to the end 30 of the first tubular member 18 and the end 32 of the third tubular member 24 by any one of a number of different coupling mechanisms. For example, glass frits may be used to secure the optical waveguide fiber 26 to the first 18 and third 24 tubular members at points A and B respectively. Alternatively, the optical waveguide fiber 26 could be metallized and soldered to the first 18 and third 24 tubular members at points A and B respectively. Reference is made to U.S. Pat. No. 5,970,194, which is incorporated herein by reference as though set forth in its entirety, for a more detailed explanation of metallizing glass optical fibers. As a further example, the optical waveguide fiber 26 could be adhesively bonded to the first 18 and third 24 tubular members at points A and B respectively. An example of an adhesive that has proven suitable is EP 62-1 available from Master Bond, Inc. of Hackensack, N.J., U.S.A.

If the optical waveguide fiber 26 is coupled to the first 18 and third 24 tubular members using an adhesive, the adhesive bonds should be in the range from about 1 mm to about 3 mm in length.

The effective coefficient of thermal expansion for the temperature-compensated optical device having very thin bond lines is given by equation 1.

$$\alpha_{\mathit{eff}} = -\frac{\alpha_2 L_2 - \alpha_1 L_1 - \alpha_3 L_3}{L_{AB}}$$

where, $\alpha_{\mathit{eff}}$=effective coefficient of thermal expansion;

$L_{AB}$=distance between point A and point B;

$\alpha_1$=coefficient of thermal expansion of the first tubular member;

$\alpha_2$=coefficient of thermal expansion of the second tubular member;

α₃=coefficient of thermal expansion of the third tubular member;

L₁=distance from point A to the end 19 of the first tubular member 18;

L₂=length of the second tubular member 21; and

L 3=distance from point B to the end 23 of the third tubular member 24,

The length of a fiber Bragg grating typically used in optical communication systems is about 13 mm.

When $L_1$ and $L_3$ are equal and the first tubular member 18 and the third tubular member 24 have the same coefficient of thermal expansion, equation (1) may be rewritten as equation (2).

$$\alpha_{\it eff} = -\frac{\alpha_2 L_2 - 2\alpha_1 L_1}{L_{AB}}$$

where, eff =effective coefficient of thermal expansion;

$L_{AB}$=distance between point A and point B;

α₁=coefficient of thermal expansion of the first tubular members;

α₂=coefficient of thermal expansion of the second tubular member;

L₁=distance from point A to the end 14 of the first tubular member 12; and

L₂=length of the second tubular member 18.

Figure 5:
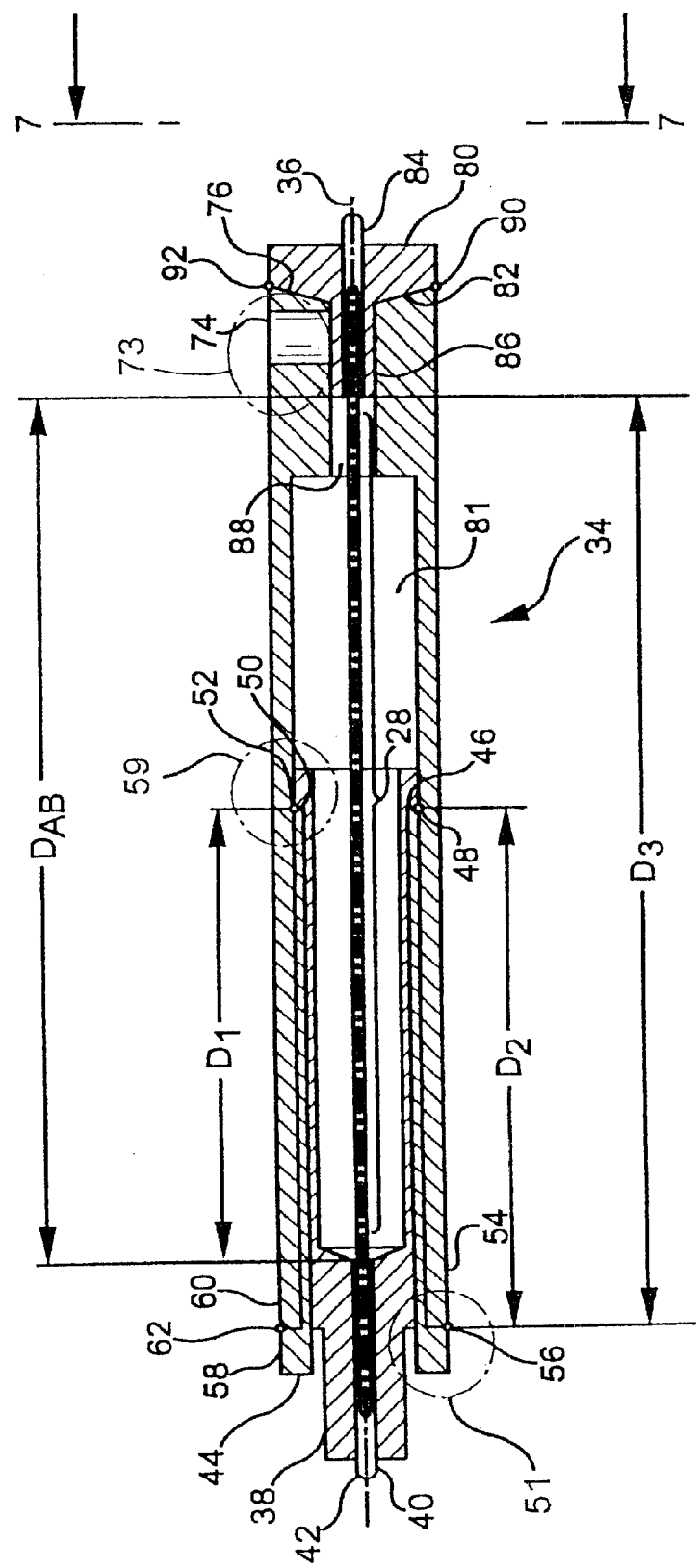
FIG. 5 is a cross-sectional view of a temperature-compensated optical device according to an alternative embodiment of the present invention.

An embodiment of the temperature-compensated optical device of the present invention is shown in FIG. 5, and is designated generally throughout by reference numeral 34. The temperature-compensated optical device 34 has a longitudinal axis 36. Preferably the temperature-compensated optical device 34 is symmetric about the longitudinal axis 36 and the fiber-grating region 28 is disposed to be coincident with the longitudinal axis 36, The temperature-compensated optical device 34 includes an inner member 38. The inner member 38 has an opening 40 for the fiber 42 to pass through. The opening 40 should be slightly larger than the diameter of the optical fiber 42. For an optical fiber 42 that is a 125 μm glass fiber with a polymer coating, such as for example, SMF-28™ optical waveguide fiber, available from Corning Incorporated of Corning, N.Y., the opening may be a circular hole having a diameter of about 0.011 inch (0.028 cm). The optical fiber 42 will be coupled to the inner member 38 using the opening 40. Preferably the opening 40 is sized to allow good mechanical attachment of the fiber 42 to the inner member 38. The dimensions of the opening 40 depend upon the attachment mechanism used. Examples of attachment mechanisms include using adhesives, glass frits and solder to attach the fiber 42 to the inner member 38. For example, when an adhesive is used to attach the fiber 42 to the inner member 38, the opening 40 is a circular hole having a diameter of about 0.011 inch. Examples of adhesives that may be used include EP 62-1 available from Master Bond, Inc. of Hackensack, N.J., U.S.A.

The temperature-compensated optical device 34 also includes a middle member 44, The middle member 44 is coupled to the inner member 38 at a predetermined location 46, The predetermined location 46 is a distance $d_1$ from where the fiber 42 is attached to the inner member 38. For example, in FIG. 5 one end 48 of the inner member 38 is coupled to an end 50 of the middle member 44 by a series of welds 52. The welds 52 may be made using a laser. The inner member 38 may also be coupled to the middle member 44 by adhesive bonding, brazing, mechanical connection, soldering, or other types of welding. Mechanical connection may include, for example, forming complementary threaded portions on the inner and middle members 38, 44.

The middle member 44 is coupled to an outer member 54. The middle member 44 is coupled to the outer member 54 at predetermined location 56. The predetermined location 56 is a distance $d_2$ from the location 46 where the inner member 38 is coupled to the middle member 44. For example, in FIG. 5 one end 58 of the middle member 44 is coupled to an end 60 of the outer member 54 by a series of welds 62. The welds 62 may be made using a laser. Mechanical connection may include, for example, forming complementary threaded portions on the inner and middle members 38, 44, riveting the inner and middle members 38, 44 together, and using pins to couple the inner member 38, to the middle member 44.

Figure 6:
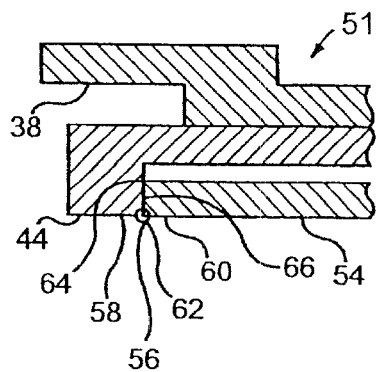
FIG. 6 is an enlarged fragmentary view of a portion 51 of the temperature-compensated optical device of FIG. 5.

FIG. 6 is illustrative of one method of locating the outer member 54 longitudinally with respect to the middle member 44. The outer member 54 is configured to be slidably engageable with the middle member 44. One end 58 of the middle member 44 has a reference surface 64. One end 60 of the outer member 54 has a surface 66 configured for registering against the reference surface 64. For example, if the reference surface 64 is perpendicular to the longitudinal axis 36 (as shown in FIG. 5) of the temperature-compensated optical device 34 and the middle member 44 is to be welded to the outer member 54 the surface 66 may also be perpendicular to the longitudinal axis 36 of the temperature-compensated optical device 34.

Figure 7:
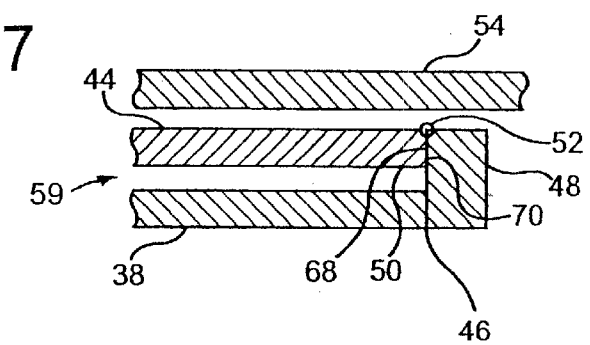
FIG. 7 is an enlarged fragmentary view of a portion 59 of the temperature-compensated optical device of FIG. 5.

FIG. 7 is illustrative of one method of locating the inner member 38 longitudinally with respect to the middle member 44. The end 50 of middle member 44 includes a reference surface 68. The inner member 38 is configured to be slidably engageable with the middle member 44. The end 48 of the inner member 38 has a surface 70 configured for registering against the reference surface 68. For example, if the reference surface 68 is perpendicular to the longitudinal axis 36 (as shown in FIG. 5) of the temperature-compensated optical device 34 and the middle member 44 is to be welded to the inner member 38 the surface 70 may also be perpendicular to the longitudinal axis 36 of the temperature-compensated optical device 34. In the embodiment shown in FIG. 5, a series of welds 52 couple the inner member 38 to the middle member 44.

It will be apparent to those of ordinary skill in the pertinent art that modifications and variations can be made in configuring the inner member 38, the middle member 44 and the outer member 54 for connection to one another. Furthermore, it will be apparent to those of ordinary skill in the art that other materials, lengths, diameters and wall thicknesses may be selected depending upon the size and thermo-optic properties of the fiber grating being temperature compensated.

Figure 8:
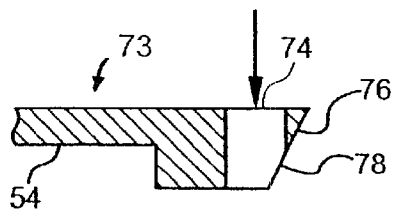
FIG. 8 is an enlarged fragmentary view of a portion 73 of the temperature-compensated optical device of FIG. 5.

Returning to FIG. 5, the outer member 54 includes a conical surface 76 having an axis of symmetry coincident with the longitudinal axis 36 of the temperature-compensated optical device 34. The outer member 54 also includes a threaded hole 74. The threaded hole is configured to receive a threaded rod (not shown), for example a bolt or screw. As shown in FIG. 8, the threaded hole 74 is disposed proximate to the conical surface 76 such that there is a region 78 of the conical surface 76 in which intersects the threaded hole 74.

Figure 9:
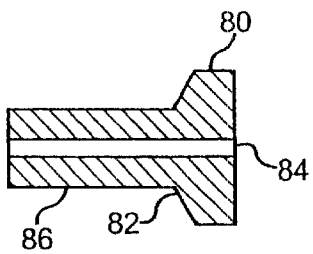
FIG. 9 is a cross-section view of an embodiment of an end cap.

Returning to FIG. 5, the temperature-compensated optical device 34 also includes an end cap 80. Preferably the end cap 80 is made of a material having the same coefficient of thermal expansion as the outer member 54. FIG. 9 is illustrative of an embodiment of the end cap 80. The end cap 80 has a conical surface 82 10 configured to engage the conical surface 76 of the outer member 54. The end cap 80 also includes a through hole 84. The hole 84 is sized to allow the optical fiber 42 to pass through it and to provide a bonding surface the optical fiber 42 may be attached to. When the optical fiber 42 has a diameter of 125 μm and is coupled to the end cap 80 by adhesive bonding the hole 84 will typically have a diameter of about 0.011 inch. A hole diameter of 0.011 inch provides clearance for a typical coated 125 μm fiber to pass through the hole while minimizing the thickness of the adhesive used to couple the optical fiber 42 to the end cap 80. It will be apparent to those of ordinary skill in the art that modifications and variations in the diameter of the hole 84 may be made to accommodate optical waveguide fibers of different dimensions and other attachment mechanisms for coupling the optical waveguide fiber 42 to the end cap 80. For example, coupling the optical waveguide fiber 42 to the end cap 80 with a glass frit or by metallizing and soldering the optical waveguide fiber 42 to the end cap may require a larger diameter hole.

The end cap 80 also includes a section 86 that is configured to engage an opening 88 in the outer member 54. The opening 88 is axisymmetric about the longitudinal axis 36 of the temperature-compensated optical device 34. The section 86 guides the end cap 80 so that the hole 84 is substantially coincident with the longitudinal axis 36 of the temperature-compensated optical device 34.

Figure 10:
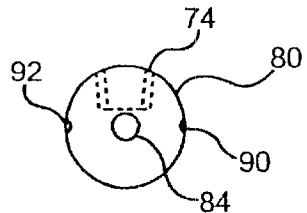
FIG. 10 is an end elevation view of the temperature-compensated optical device shown in FIG. 5.

In one embodiment of the invention the end cap 80 is coupled to the outer member 54 by welding, for example by laser welding. Turning to FIG. 10 for clarity two welds 90, 92 secure the end cap 80 to the outer member 54. Preferably, the welds 90, 92 are opposite one another on the perimeter of the temperature-compensated optical device and are disposed so that a line connecting the two welds 90, 92 is approximately perpendicular to the axis of the threaded hole 74.

Typically, the temperature-compensated optical device 34 will be assembled by coupling the inner member 38, middle member 44, outer member 54 and the end cap 80 to one another as described above. The optical fiber 42 is then inserted into this assembly so that the fiber grating region is located within the interior cavity 81 of the temperature-compensated optical device 34. The fiber-grating region 28 is tensioned to a pre-selected value corresponding to a specific operating center wavelength. The optical fiber 42 is then coupled to the inner member 38 and the end cap 80, so that the fiber-grating region 28 is suspended in the interior cavity and is not directly coupled to either the inner member 38 or the end cap 80.

The center wavelength of the fiber-grating region 28 may be adjusted by inserting a threaded member (not shown), for example a bolt, screw, set screw or threaded rod into the threaded hole 74. As the threaded member moves in the direction indicated by the arrow in FIG. 8, the major diameter of the threads will protrude through the conical surface 76 in the region 78 thus contacting the conical surface 82 of the end cap 80. As the engagement of the threaded member with the threaded hole 74 increase more force is exerted on the end cap 80. Because the end cap 80 is substantially constrained by the interaction of the section 86 of the end cap 80 engaged with the opening 88 to movement along the longitudinal axis of the temperature-compensated optical device 34 the tensile strain in the fiber-grating region 28 is increased. This increase in the strain of the fiber grating region 28 allows the operating waveband of the fiber grating region 28 to be tuned.

It will be apparent to those of ordinary skill in the pertinent art that modifications and variations can be made to the inner member 38, the middle member 44 and the outer member 54 of the present invention depending on design constraints. For example, the inner member 38, the middle member 44 and the outer member 54 may be rectangular, hexagonal, octagonal or triangular in cross section rather than the circular cross section used as an example throughout the detailed descriptions presented above.

The temperature-compensating package 34 of the present invention offers the advantage that is may be assembled before being joined to the optical fiber device.

Figure 11:
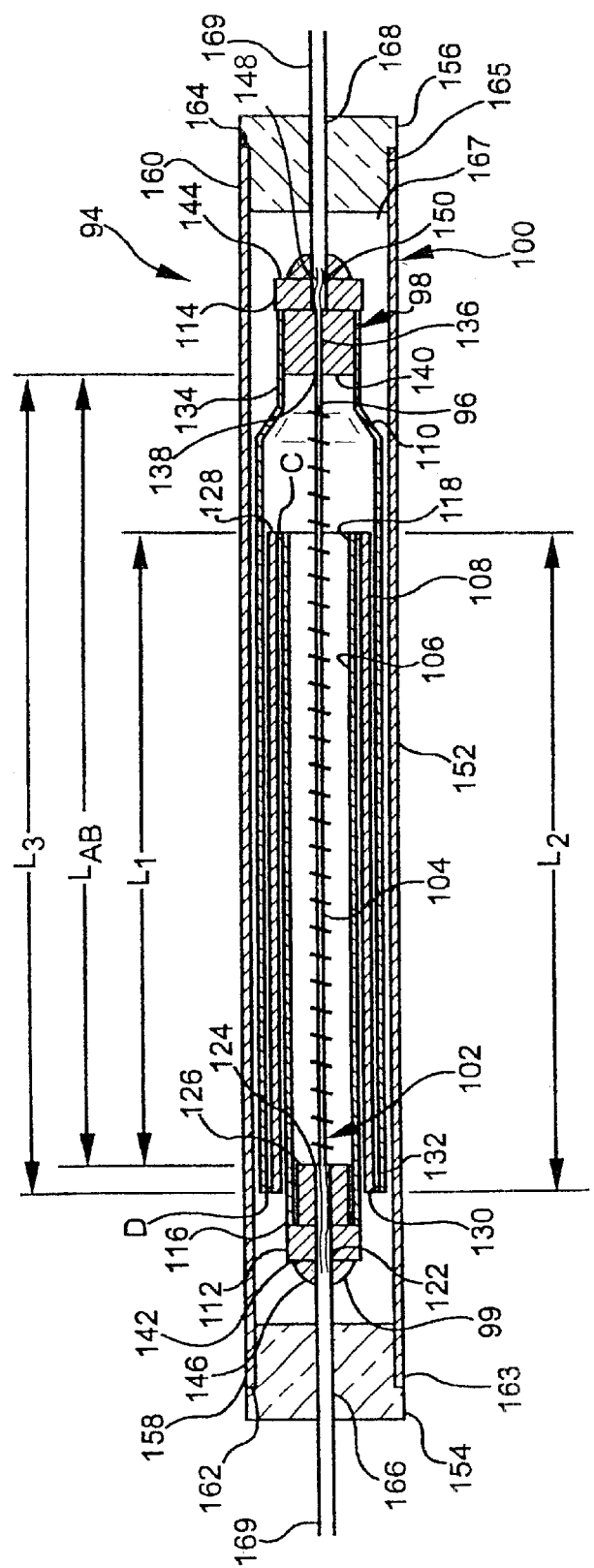
FIG. 11 is a cross-sectional view of a temperature-compensated optical device according to an alternative embodiment of the present invention.

An alternative embodiment of the temperature-compensated optical device of the present invention is shown in FIG. 11, and is designated generally throughout by reference numeral 94.

As embodied herein, and depicted in FIG. 11, the temperature-compensated optical device 94 includes an optical fiber device 96, a temperature-compensating package 98 and an over-package 100. The optical fiber device 96 is made from an optical fiber having a protective coating. The protective coating is typically a polymer, however, as will be appreciated by those skilled in the art of making optical fiber devices other coatings, such as, for example, metallic coatings are sometimes used. The optical fiber device 96 includes a stripped region 102 from which the protective coating is removed. The stripped region 102 includes a grating 104, such as, for example, a Bragg grating or a long-period grating.

The temperature-compensating package 98 includes an inner member 106, a middle member 108, an outer member 110, and two caps 112, 114. The inner member 106 may be an axisymmetric longitudinal body. The inner member 106 includes two ends 116, 118. The inner member 106 is made from a material having a coefficient of thermal expansion that is less than the coefficient of thermal expansion of the middle member 108. Preferably the inner member 106 is made from a material having a low coefficient of thermal expansion such as Invar®. The inner member 106 may be made using any one of or a combination of methods known to those skilled in the art of fabricating metallic components, such as, for example, machining, stamping or turning on a mandrel.

One cap 112 is configured for engagement with an end 116 of the inner member 106. The end cap 112 includes a through hole 122. The through hole 122 is positioned so that when the end cap 112 is coupled to the end 116 of the inner member, such as, for example, by adhesive bonding, the axis of the through hole is coincident with the longitudinal axis of the inner member 106. The through hole 122 is typically a round hole sized to allow the end cap 112 to be threaded onto an optical fiber 96, such as, for example an SMF-28™ optical waveguide fiber, available from Corning Incorporated of Corning, N.Y., and then to be adhesively bonded to the optical fiber 96. Preferably, the diameter of the through hole 122 is about 0.011 inch (0.028 cm) when the optical fiber 96 has a diameter of about 125 μm. This diameter allows the adhesive, such as, for example, EP 62-1 available from Master Bond, Inc. of Hackensack, N.J., U.S.A. to have as thin a bond line while still holding the optical fiber 96 securely in position. A thin bond line is advantageous because it is more resistant than a thick bond line to the diffusion of water through the adhesive. Preferably, the through hole 122 forms a sharp edge 124 with the surface 126 of the end cap 112.

The end cap 112 may be coupled to the inner member 106, such as, for example, by adhesive bonding, brazing, soldering or welding.

The middle member 108 includes two ends 128, 130 and may be an axisymmetric longitudinal body. The middle member 108 is made from a material having a coefficient of thermal expansion greater than the coefficients of thermal expansion of the inner member 106 and the outer member 110. Preferably, the middle member 108 is made from a high thermal expansion material, such as, for example a American Iron and Steel Institute (AISI) 300 series stainless steel, a specific example of which is AISI 309 stainless steel, designated as S30900 under the Unified Number System. The middle member 108 may be made using any one of or a combination of methods known to those skilled in the art of fabricating metallic components, such as, for example, machining, stamping or turning on a mandrel.

The outer member 110 has two ends 132, 134 and may be an axisymmetric longitudinal member, such as, for example, a tubular member. Preferably the outer member 110 is made from material having a low coefficient of thermal expansion that decreases as temperature increases, such as, for example, Kovar® or Alloy 42. The outer member 110 may be made using any one of or a combination of methods known to those skilled in the art of fabricating metallic components, such as, for example, machining, stamping or turning on a mandrel. The outer member 110 is configured to fit over the middle member 108 so that one end 132 may be coupled to an end 130 of the middle member 108. The outer member 10 may be coupled to the middle member 108 by adhesive bonding, brazing, soldering, or welding. Preferably the method of coupling the outer member 110 to the middle, member 108 does not result in a hermetic seal, an example of a coupling means that securely couples the outer member 110 to the middle member 108 without forming a hermetic or near hermetic seal is spot welding using a laser. Coupling the outer member 110 to the middle member 108 by laser spot welding offers the additional advantage that the locations of the welds may be precisely controlled.

The other end 134 of the outer member 110 is configured to receive an end cap 114. The end cap 114 may be identical to the end cap 112 used on the end 116 of the inner member 106. When the outer member 110 is a cylindrical, such as, for example as shown in FIG. 11, the inner diameter of the end 134 may be reduced so that it is substantially the same as the inner diameter of the inner member 106. This allows both of the end caps 112, 114 to be identical. In any case, the end cap 114 includes a through hole 136. The through hole 136 is located in the end cap 114 so that when the end cap 114 is coupled to the end 134 of the outer member 110 it is substantially aligned with the hole 122 in the end cap 112. The through hole 136 is typically a round hole sized to allow the end cap 114 to be threaded onto an optical fiber 96, such as, for example an SMF-28™ optical waveguide fiber, available from Corning Incorporated of Corning, N.Y., and then to be adhesively bonded to the at least partially bare optical fiber 96. Preferably, the diameter of the through hole 136 is about 0.011 inch when the optical fiber 96 has a diameter of about 125 μm. This diameter allows the adhesive, such as, for example, EP 62-1 available from Master Bond, Inc. of Hackensack, N.J., U.S.A. to have as thin a bond line while still holding the optical fiber 96 securely in position. A thin bond line is advantageous because it is more resistant than a thick bond line to the diffusion of water through the adhesive. Preferably, the through hole 136 forms a sharp edge 138 with the surface 140 of the end cap 114 since that defines the critical suspended length dimension of the fiber.

The temperature-compensating package 98 may be assembled before threading it onto an optical fiber device 96. Alternatively, the inner member 106, middle member 108 and outer member 110 may be coupled to one another as described above and threaded onto the optical fiber device 96 separately from the end caps 112, 114.

The temperature-compensating package 98 is positioned on the optical fiber device 96 so that it is substantially centered on the stripped portion 102. Preferably, the grating 104 is centered between the two surfaces 126, 140 of the end caps 112, 114, Typically, the stripped portion will extend about 0.5 mm beyond the end surfaces 142, 144 of the end caps 112, 114. The optical fiber device 96 is tensioned, such as, for example by applying a tensile stress of about 580 psi to the optical fiber device 96, however, as will be appreciated by those skilled in the art of packaging grating, the amount of tension applied to the optical fiber device 96 depends upon the desired center wavelength of the grating 104 after assembly.

The optical fiber device 96 and the temperature-compensating package 98 are heated to between about 115° C. and about 135° C., preferably to about 130° C. Approximately 1 mm³ of an adhesive, such as, for example, EP 62-1 available from Master Bond, Inc. of Hackensack, N.J., U.S.A. is applied to the point 99 where the optical fiber device 96 extends from the temperature-compensating package 98, The adhesive is drawn into the hole 122 by capillary action filling the volume around the optical fiber device 96. As long as there is enough adhesive to fill the entire volume about the optical fiber device 96 and the edge 124 is sufficiently well defined, the surface tension of the adhesive will prevent it from flowing past the surface 126 of the end cap 112. The adhesive is then allowed to cure for about 1 to about 5 minutes, depending on the temperature and the specific adhesive used. After the adhesive coupling the optical fiber device 96 to the sides of the hole 122 has cured an additional amount of adhesive is applied to the stripped portion 102 of the optical fiber device 96 extending past the surface 142 of the end cap 112. This additional adhesive is formed into a strain relief boot 146 and is then allowed to cure.

Similarly, about 1 mm³ of adhesive, such as, for example, EP 62-1 available from Master Bond, Inc. of Hackensack, N.J., U.S.A. is applied to the point 148 where the optical fiber device 96 extends from the temperature-compensating package 98, The adhesive is drawn into the hole 136 by capillary action filling the volume around the optical fiber device 96. As long as there is enough adhesive to fill the entire volume about the optical fiber device 96 and the edge 138 is sufficiently well defined, the surface tension of the adhesive will prevent it from flowing past the surface 140 of the end cap 114. The adhesive is then allowed to cure for about 1 to about 5 minutes, depending on the temperature and the specific adhesive used. After the adhesive coupling the optical fiber device 96 to the sides of the hole 136 has cured an additional amount of adhesive is applied to the stripped portion 102 of the optical fiber device 96 extending past the surface 144 of the end cap 114. This additional adhesive is formed into a strain relief boot 150 and is then allowed to cure. After the adhesive has cured the assembly is cooled to room temperature.

The effective coefficient of thermal expansion of the temperature-compensating package 98 may be calculated according to equation 1. The distance $L_{AB}$, which defines the effective length of the temperature-compensating package 98 is the distance between the surfaces 126, 140 of the end caps 112, 114. The distance L, is the linear distance from the surface 126 of the end cap 112 to the point C where the end 118 of the inner member 106 is coupled to the end 128 of the middle member 108. The distance $L_2$ is the linear distance from point C to the point D where the end 130 of the middle member 108 is coupled to the end 132 of the outer member 110. The distance $L_3$ is the linear distance between point D and the surface 140 of the end cap 114.

In one example, the inner member 106 and the outer member 110 are made from Alloy 42. The middle member is made from AISI 304 stainless steel having an average coefficient of thermal expansion of $150 \times 10^{-7}$ per ° C. over the temperature range of interest in optical communication system applications. The distances of interest in the example are: $L_{AB}$ is equal to 42 mm, $L_1$ is equal to 35 mm, $L_2$ is equal to 28 mm and $L_3$ is equal to 35 mm. This selection of materials and dimensions results in a temperature-compensating package 98 with an effective coefficient of thermal expansion of $-75 \times 10^{-7}$ per ° C.

The over-package 100 includes a sleeve 152 and two end caps 154, 156. The sleeve 152 may be made from a stainless steel, such as, for example, an American Iron and Steel Institute (AISI) 300 series stainless steel, a specific example of which is AISI 304 stainless steel, designated as S30400 under the Unified Number System. The sleeve 152 may be a tube, such as, for example a tube having an outside diameter of about 4 mm and a wall thickness of about 0.008 inch.

The end caps 154, 156 are configured to engage the ends 158, 160 of the sleeve 152. The end caps 154, 156 may be in the form of a cylinder having a shoulder 162, 164 to bank against the ends 158, 160 of the sleeve 152. Typically the diameter of the regions 163, 165 of the end caps 154, 156 that fit inside the sleeve 152 are about 0.002 inch less than the inside diameter of the sleeve 152. The sleeve 152 and end caps 154, 156 are threaded onto the optical fiber device 96. The sleeve 152 is preferably centered over the temperature-compensating package 98 and then the end caps 154, 156 are coupled to the sleeve 152 and the optical fiber device 96 thereby forming a hermetic or near-hermetic cavity 167.

The end caps 154, 156 are coupled to the sleeve 152 by heating the sleeve 152, end caps 154, 156, optical fiber device 96 and the temperature-compensating package 98 to about 130° C. The end caps 154, 156 are inserted into the ends 158, 160 of the sleeve 152. An adhesive, such as, for example, EP 62-1 available from Master Bond, Inc. of Hackensack, N.J., U.S.A. is applied to the interface of the shoulders 162, 164 and the sleeve 152 ends 158, 160. The adhesive is drawn into the space between the inside diameter of the sleeve 152 and the end caps 154, 156. Careful selection of the adhesive and the dimensions of the end caps 154, 156 and the sleeve 152 inside diameter will result in a hermetic or near hermetic seal between the end caps 154, 156 and the sleeve 152 when the adhesive has cured.

It will be apparent to those of ordinary skill in the art of forming hermetic or near-hermetic seals that modifications and variations can be made to the means of coupling the end caps 154, 156 to the sleeve 152. For example, the sleeve 152 can be coupled to the end caps 154, 156 brazing, soldering or welding.

Each of the end caps 154, 156 includes a through hole 166, 168. The diameter of the through holes 166, 168 are such as to allow the end caps 154, 156 to be threaded on to the optical fiber device 96 and allow the end caps 154, 156 to be coupled to the optical fiber device 96 thus forming a hermetic or near hermetic seal. Preferably, the diameter of the through holes 166, 168 is about 0.011 inch when the optical fiber device 96 has a diameter of about 125μm exclusive of the coating.

The sleeve 152 with the end caps 154, 156 coupled to it is positioned so that the temperature-compensating package 98 is substantially centered within the cavity 167, The illustrated optical fiber device 96 may be tensioned by the same amount as used when coupling the temperature-compensating package 98 to the optical fiber device 96, Adhesive, such as, for example EP 62-1 available from Master Bond, Inc. of Hackensack, N.J., U.S.A. is applied to the holes 166, 168 and fills the space between the coated portions 169 of the optical fiber device 96 and the sides of the holes 166, 168 by capillary action thereby forming hermetic or near-hermetic seals. The temperature-compensated optical device 94 must be in an isothermal condition when the final hole is filled with adhesive. After the adhesive is cured the tension is removed from the optical fiber device 96 and the completed temperature-compensated optical device 94 is allowed to cool to room temperature. The center wavelength of the grating 104 when the completed temperature-compensated optical device 94 is at room temperature is determined by the tension applied to the optical fiber device 96 during the assembly process, the temperature during the assembly process and the thermal response of the complete assembly as it cools.

It will be apparent to those of ordinary skill in the art of packaging optical fiber devices that modifications and variations can be made to the means of coupling the end caps 154, 156 to the optical fiber device 96. For example, the optical fiber device 96 can be coupled to the end caps 154, 156 by metallizing the optical fiber device 96 and soldering it to the end caps 154, 156 or by using glass frits.

It will be apparent to those of ordinary skill in the art of packaging optical fiber devices that modifications and variations can be made to the end caps 154, 156 to the sleeve 152. For example, the sleeve 152 and the end caps 154, 156 can be made from ceramic, glass-ceramic or glass and coupled to one another and the optical fiber device 96 to form a hermetic or near-hermetic cavity 167 using techniques known to those skilled in the pertinent art, such as, for example, adhesive bonding, glass frits, metallizing and soldering surfaces together and fusing surfaces to one another using concentrated heat. The effective coefficient of thermal expansion is again determined using equation 1, where $L_1$, $L_2$, $L_3$, $L_{AB}$ are as indicated in FIG. 11.

Figure 12:
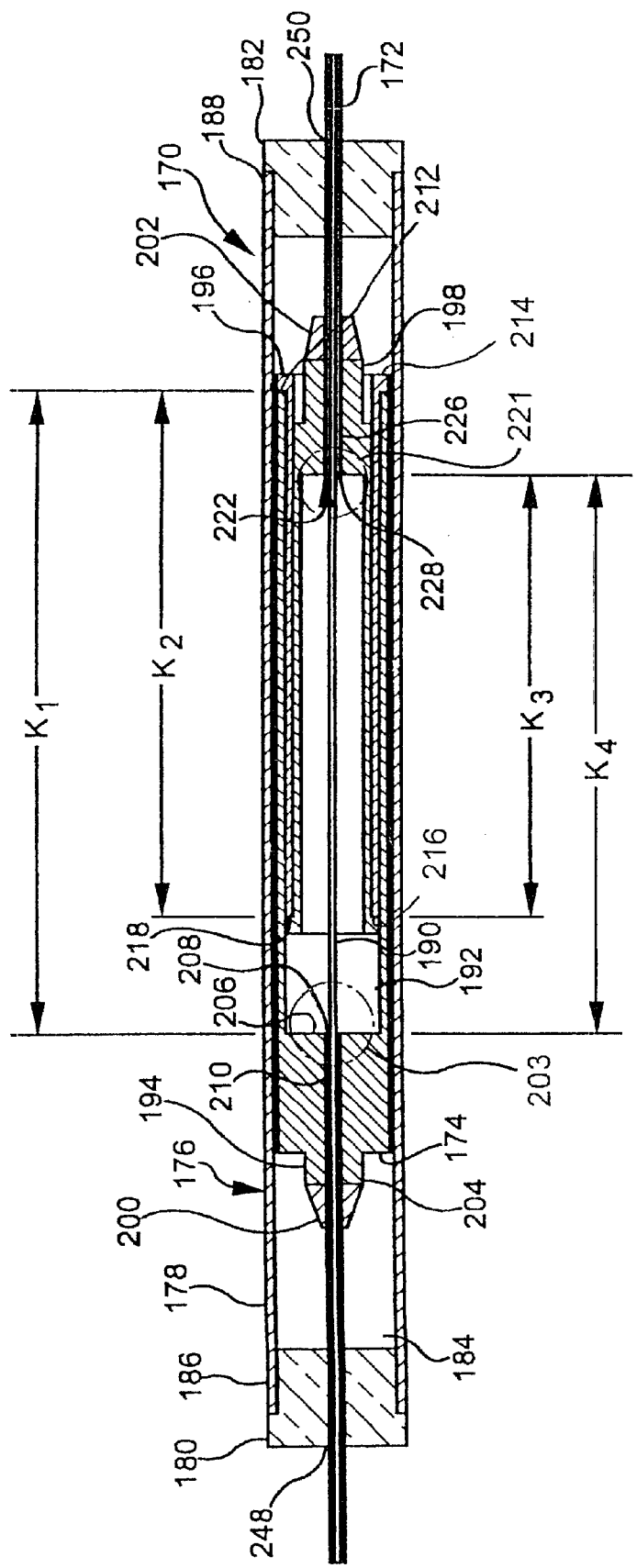
FIG. 12 is a cross-sectional view of a temperature-compensated optical device according to an alternative embodiment of the present invention.

FIG. 12 shows an alternative embodiment in which the temperature-compensated optical device 170 of the present invention includes an optical fiber device 172, a temperature-compensating package 174 and an over-package 176. The temperature-compensating package 174 is encapsulated by the over-package 176.

The over-package 176 includes a sleeve 178 and two end caps 180, 182. The sleeve 178 and the two end caps 180, 182 together define a cavity 184. The temperature-compensating package 174 is contained within the cavity 184. The sleeve 178 and the two end caps 180, 182 are configured and coupled together to from a hermetic or near-hermetic barrier isolating the cavity 184 from ambient atmospheric conditions. The sleeve 178 may be of any shape, such as, for example, circular, polygonal, rectangular, or triangular. The sleeve 178 may be made from any material, such as, for example, ceramic, glass, metal or a polymer that is impermeable to water vapor and provides for a robust package that satisfies predetermined shock and vibration specifications. A specific example of a metal from which the sleeve 178 may be made is AISI 304 stainless steel.

Each of the end caps is configured to engage an end 186, 188 of the sleeve 178, The end caps 180, 182 may be made from ceramic, glass, metal or a polymer. A specific example of a metal from which the sleeve 178 may be made is AISI 304 stainless steel. The end caps 180 182 may be coupled to the respective ends 186, 188 of the sleeve 178 by adhesive bonding, brazing, soldering or welding. Alternatively, the end caps 180, 182 may be molded in place, out of a suitable material, such as, for example, a polymeric material that is impermeable to contaminating gases and liquids, such as, for example water or water vapor.

The optical fiber device 172 includes an optical device region 190 that it is desirable to athermalize, such as, for example a fiber Bragg grating region. The optical device, region 190 of the optical fiber device 172 is contained within the cavity 192 of the temperature-compensating package 174. The temperature-compensating package 174 includes a first axisymmetric member 194, a second axisymmetric member 196, a third axisymmetric member 198, a first strain relief member 200 and a second strain relief member 202.

Figure 13:
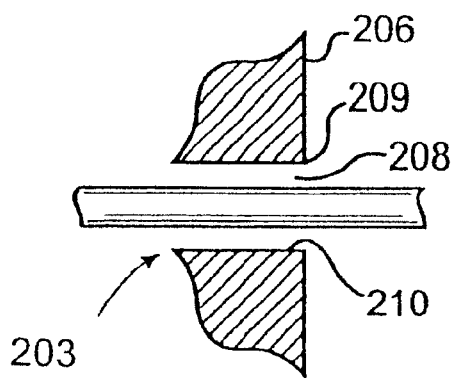
FIG. 13 is enlarged fragmentary view of a portion 203 of the temperature-compensated optical device of FIG. 12.

The first axisymmetric member 194 includes an end 204 having a reference surface 206, a hole 208 passes through the reference surface 206. The intersection of the hole 208 and the reference surface 206 should result in a sharp edge 209 (FIG. 13). The sharp edge 209 prevents adhesive flowing through the hole 208 by capillary action from flowing along the optical fiber device 172 into the cavity 192. The hole 208 is sized to allow the optical fiber device 172 to pass through and to have walls 210 to which the optical fiber device 172 may be coupled to, such as, for example by adhesive bonding. The first axisymmetric member 194 also includes a reference surface 212 at a distance $K_1$, from the reference surface 206. Preferably, the two reference surfaces 206, 212 are perpendicular to the longitudinal axis of the first axisymmetric member 194. The first axisymmetric member 194 is preferably made of a material having a low coefficient of thermal expansion that decreases as temperature increases, such as, for example Kovar® or Alloy 42, which are commercially available from specialty metal suppliers. The first axisymmetric member 194 may be made by made by a number of manufacturing processes, such as, for example, machining or precision stamping. The distance $K_1$, between the two reference surfaces 206, 212 corresponds to $L_1$ in equation 1.

The second axisymmetric member 196 also includes two reference surfaces 214, 216 located some distance apart from one another. Preferably, the two reference surfaces 214, 216 are perpendicular to the longitudinal axis of the second axisymmetric member 196. One of the reference surfaces 214 is configured to engage reference surface 212 of the first axisymmetric member 194. The second axisymmetric member 196 is coupled to the first axisymmetric member 194 at the interface of the two reference surfaces 212, 214. The second axisymmetric member 196 may be coupled to the first axisymmetric member 194 for example by adhesive bonding, brazing, soldering or welding. The distance $K_2$ between the two reference surfaces 214, 216 corresponds to $L_2$ in equation 1. The second axisymmetric member 196 is made from a material, such as, for example stainless steel, having a coefficient of thermal expansion greater than that of the first axisymmetric member 194. The second axisymmetric member 196 may be made by made by a number of manufacturing processes, such as, for example, machining or progressive stamping.

Figure 14:
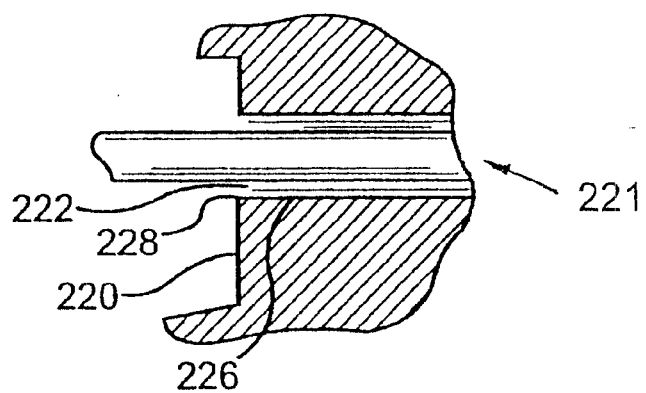
FIG. 14 is an enlarged fragmentary view of a portion 221 of the temperature-compensated optical device of FIG. 12.

The third axisymmetric member 198 also includes two reference surfaces 218, 220 (FIG. 14). Preferably, the two reference surfaces 218, 220 are perpendicular to the longitudinal axis of the third axisymmetric member 198. One reference surface 218 is configured to engage a reference surface 216 of the second axisymmetric member 196, The third axisymmetric member 198 is coupled to the second axisymmetric member 196 at the interface of the two reference surfaces 216, 218. The third axisymmetric member 198 may be coupled to the second axisymmetric member 196 for example, by adhesive bonding, brazing, soldering or welding. Preferably, the coupling of the third axisymmetric member 198 to the second axisymmetric member 196 does not result in a complete seal at the interface of the two reference surfaces 216, 218. The lack of a complete seal at the interface of the two reference surfaces 216, 218 prevents the build up of pressure inside the temperature-compensating package 174 in response to variations in temperature. The distance $K_3$ between the two reference surfaces 218, 220 corresponds to $L_3$ in equation 1. The third axisymmetric member 198 is made from a material having a lower coefficient of thermal expansion than the second axisymmetric member 196. Preferably, the third axisymmetric member 198 is made of a material having a low coefficient of thermal expansion that increases with increasing temperature such as, for example, Invar®.

The reference surface 220 is intersected by a hole 222. Preferably, the hole 222 is coincident with the longitudinal axis of the third axisymmetric member 198. Preferably, the hole 222 and the hole 208 are substantially aligned with one another and are sized so that an optical fiber, such as, for example the optical fiber device 172, may pass in a straight line between the two holes 208, 222 and be coupled to the respective walls 210, 226 of the two holes 208, 222.

For a typical optical fiber device 172, such as, for example, a fiber Bragg grating written in SMF-28™ optical waveguide fiber, available from Coming Incorporated of Corning, N.Y., the two holes 208, 222 will have a diameter of about 0.011 inch.

The optical fiber device 172 may be coupled to the walls 210, 226 by using an epoxy, such as, for example EP 62-1 available from Master Bond, Inc. of Hackensack, N.J., U.S.A.

The intersection of the hole 222 and the reference surface 220 should result in a sharp edge 228. The sharp edge 228 prevents adhesive flowing into the hole 226 by capillary action from flowing along the optical fiber device 172 into the cavity 192.

The optical fiber device 172 is coupled to the temperature-compensating package 174 by first threading the optical fiber device 172 through the two holes 208, 222 of the temperature-compensating package 174. The optical fiber device 172 includes a stripped region 230 from which the protective coating, typically a polymeric coating, has been removed. The optical device region 190 is contained within the stripped region 230 of the optical fiber device 172. The stripped region 230 extends about 0.5 mm beyond each end 232, 234 of the temperature-compensating package 174. The optical device region 190 of the optical fiber device 172 containing the optical element, such as, for example a fiber Bragg grating, that it is desired to athermalize is preferably centered in the cavity 192 between the two reference surfaces 206, 220. The optical fiber device 172 is then tensioned. As will be appreciated by those skilled in the art, the amount of tensioning depends on the optical element contained in the optical device region 190 of the optical fiber device 172. For example, when the optical device region 190 contains a fiber Bragg grating the tension of the optical device region 190 is selected so that the fiber Bragg grating has certain optical properties, such as, for example, a certain center wavelength.

The temperature-compensating package 174 with the optical fiber device 172 positioned within it is then isothermally heated to between about 115° C. and 135° C., preferably to about 130° C. An adhesive, such as, for example EP 62-1 available from Master Bond, Inc. of Hackensack, N.J., U.S.A. is placed at the opening 236 around the optical fiber device 172 where it exits the end 234 of the temperature-compensating package 174. The adhesive is drawn into the space 238 between the stripped portion 230 of the optical fiber device 172 and the walls 210 of the hole 208 by capillary action. The flow of adhesive stops when it reaches the reference surface 206 provided there is enough adhesive to fill the entire space 238 between the stripped portion 230 of the optical fiber device 172 and the walls 210 of the hole 208. When the hole 208 is a circular hole the space 238 becomes an annulus. The adhesive is then cured, for a thermal setting adhesive, such as, for example EP 62-1 the cure time of the adhesive is in the range from about 1 minute to about 5 minutes. As will be appreciated by those skilled in the art of using adhesives however, cure times vary with the specific adhesive.

After the adhesive has cured, the stripped region 230 of the optical fiber device 172 extending beyond the end 234 is coated with a small amount of adhesive in order to provide some strain relief.

Similarly, adhesive is placed at the opening 242 around the optical fiber device 172 where it exits the other end 232 of the temperature-compensating package 174, The adhesive is drawn into the space 244 between the stripped portion 230 of the optical fiber device 172 and the walls 226 of the hole 222 by capillary action. Provided there is enough adhesive to fill the space 244 between the walls 226 of the hole 222 and the stripped portion 230 of the optical fiber device 172, the adhesive will stop flowing when it reached the reference surface 220. When the hole 222 is circular the space 244 is an annulus. The adhesive is then cured. After the adhesive has cured, the stripped region 230 of the optical fiber device 172 extending beyond the end 232 is coated with a small amount of adhesive in order to provide some strain relief. The assembly of the optical fiber device 172 and the temperature-compensating package 174 are then allowed to cool to the ambient temperature.

The tension in the optical fiber device 172, the temperature at which the optical fiber device was coupled to the temperature-compensating package 174 and the thermal response of the optical fiber device 172 are all factors that determine the optical properties of the optical device region 190 of the optical fiber device 172. For example, if the optical device region 190 of the optical fiber device 172 is a Bragg grating then the center wavelength of the Bragg grating will depend upon, the temperature at which the optical fiber device was coupled to the temperature-compensating package 174 and the thermal response of the optical fiber device 172.

After the optical fiber device 172 is coupled to the thermal-compensating package 174 strain relief boots 200, 202 may be fitted to the optical fiber device 172 where it exits the temperature-compensating package 174. The strain relief boots prevent the formation of a severe stress concentration where the optical fiber device 172 exits the ends 232, 234 of the thermal-compensating package 174 thereby contributing to a more robust package. The strain relief boots may take the form of additional adhesive formed into a substantially conical shape, may be formed of an elastomeric material or any other suitable material known to those skilled in the art of packaging optical fiber devices. As will be appreciated by those skilled in the art of packaging optical fiber devices, the dimensions and material selection of the strain relief boots 200, 202 is a design choice readily made by those skilled in the art.

After the strain relief boots 200, 202 are fitted, the assembled temperature-compensating package 174 and optical fiber device 172 are encapsulated by the over package 176. Typically, the sleeve 178 is positioned so that it is approximately coaxial with the temperature-compensating package 174, and the temperature-compensating package 174 is centered along the length of the sleeve 178. Typically, there will be a difference of from about 0.002 inches to about 0.004 inches between the inner diameter of the sleeve 178 and the outer diameter of the temperature-compensating package 174, The ends 186, 188 of the over package 176 are then sealed by coupling the end caps 180, 182 to the ends 186, 188 of the sleeve 178. Preferably, the optical fiber device 172 passed through the approximate radial center of each end cap 180, 182 and each end cap 180, 182 is sealed to the optical fiber device 172. The end caps 180, 182 may, for example, be sealed to the optical fiber device using an adhesive that is impermeable to water. Alternatively, it is appreciated that in an alternative embodiment, the end caps 180, 182 may have a groove (not shown) sized to facilitate the passage of the optical fiber device 172 from the cavity 184 to the outside of the over package 176. If a grooved embodiment of the end caps 180, 182 is used the volume of the groove not occupied by the optical fiber device 172 must be sealed, such as, for example, by using an adhesive, to prevent contaminate gases or liquids, such as, for example, water or water vapor, from reaching the optical device region 190.

In one embodiment of the present invention the sleeve 178 and end caps 180, 182 are all made from AISI 304 stainless steel. The sleeve 178 and end caps 180, 182 are threaded onto the assembled temperature-compensating package 174 and optical fiber device 172.

The end caps 180, 182 are coupled to the sleeve 178 by heating the sleeve 178, end caps 180, 182, optical fiber device 172 and the temperature-compensating package 174 to about 130° C. The end caps 180, 182 are inserted into the ends 186, 188 of the sleeve 178. An adhesive, such as, for example, EP 62-1 available from Master Bond, Inc. of Hackensack, N.J., U.S.A. is applied to the interface of the shoulders 982, 984 and the ends 186, 188 of the sleeve 178. The adhesive is drawn into the space between the inside diameter of the sleeve 178 and the end caps 180, 182. Careful selection of the adhesive and the dimensions of the end caps 180, 182 and the sleeve 178 inside diameter will result in a hermetic or near hermetic seal between the end caps 180, 182 and the sleeve 178 when the adhesive has cured.

It will be apparent to those of ordinary skill in the art of forming hermetic or near-hermetic seals that modifications and variations can be made to the means of coupling the end caps 180, 182 to the sleeve 178. For example, the sleeve 178 can be coupled to the end caps 180, 182 brazing, soldering or welding.

The sleeve 178 with the end caps 180, 182 coupled to it is positioned so that the temperature-compensating package 174 is substantially centered within the cavity 184, The optical fiber device is tensioned the same amount used when coupling the temperature-compensating package 174 to the optical fiber device 172. Adhesive, such as, for example EP 62-1 available from Master Bond, Inc. of Hackensack, N.J., U.S.A. is applied to the holes 248, 250 and fills the space between the coated portions 252 of the optical fiber device 172 and the sides of the holes 248, 250 by capillary action thereby forming hermetic or near-hermetic seals. After the adhesive is cured the tension is removed from the optical fiber device 172 and the completed temperature-compensated optical device 170 is allowed to cool to room temperature. If the optical device region 190 contains a fiber Bragg grating the center wavelength of the grating when the completed temperature-compensated optical device 170 is at room temperature is determined by the tension applied to the optical fiber device 172 during the assembly process, the temperature during the assembly process and the thermal response of the complete assembly as it cools.

It will be apparent to those of ordinary skill in the art of packaging optical fiber devices that devices that modifications and variations can be made to the means of coupling the end caps 180, 182 to the optical fiber device 172. For example, the optical fiber device 172 can be coupled to the end caps 180, 182 by metallizing the optical fiber device 172 and soldering it to the end caps 180, 182 or by using glass frits.

The effective coefficient of thermal expansion is determined using equation 1, where $K_1$, $K_2$, $K_3$ and $K_4$ from FIG. 12 are substituted for $L_1$, $L_2$, $L_3$ and $L_{AB}$ respectively.

In one example, the first axisymmetric member 194 and the third axisymmetric member 198 are made from Alloy 42. The second axisymmetric member 196 is made from AISI 304 stainless steel having a coefficient of thermal expansion of $150 \times 10^{-7}$ per ° C. over the temperature range of interest in optical communication system applications. The distances of interest in the example are: $L_{AB}$ is equal to 42 mm, $L_1$ is equal to 35 mm, $L_2$ is equal to 28 mn and $L_3$ is equal to 35 mm.

Figure 15:
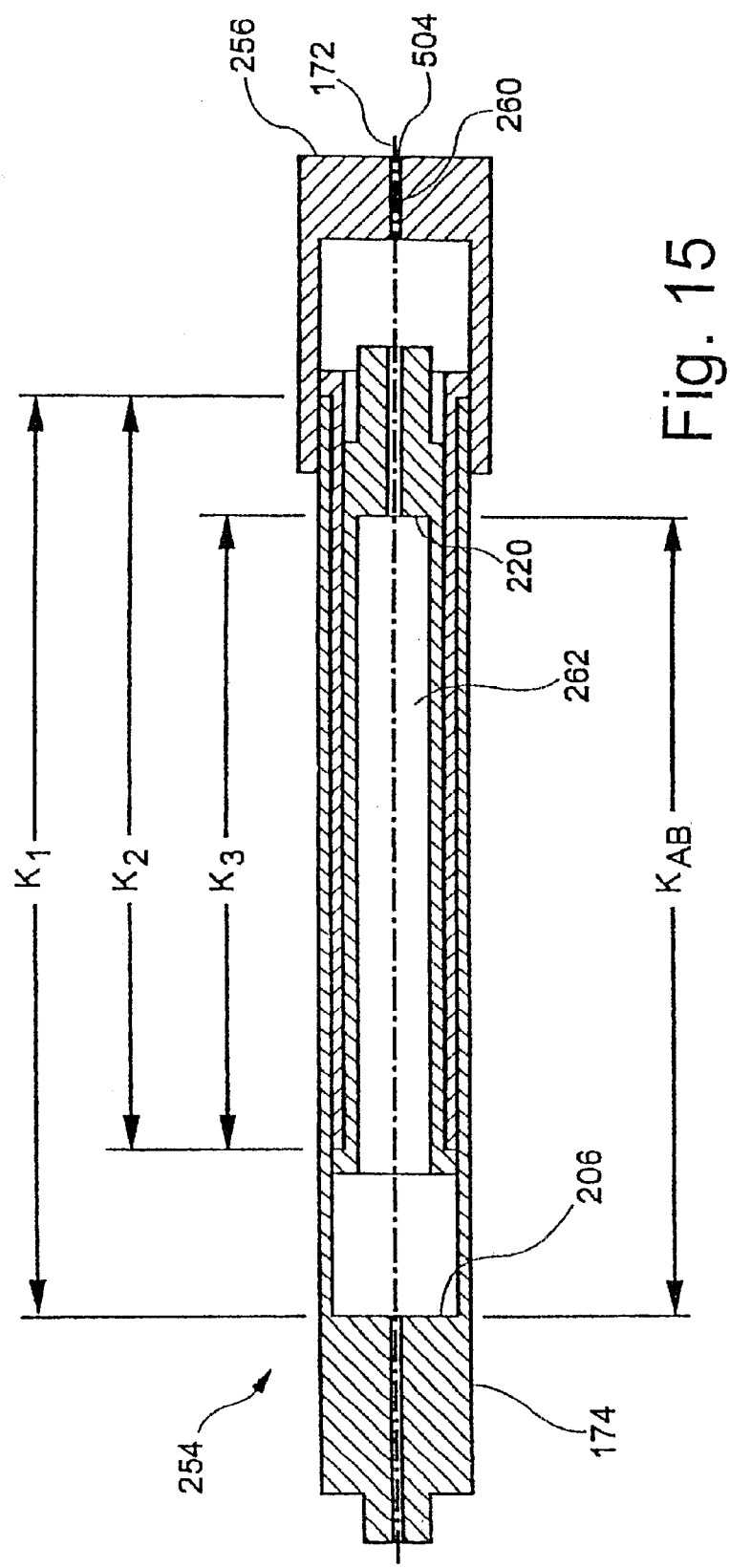
FIG. 15 is a cross-sectional view of a temperature-compensated optical device according to an alternative embodiment of the present invention.

FIG. 15 shows an alternative embodiment in which the temperature-compensated optical device 354 of the present invention includes an optical fiber device 372, a temperature-compensating package 374 and an end cap 356.

The end cap 356 is hermetically coupled to the outside of the temperature-compensating package 374. In the embodiment shown in FIG. 15 the end cap 356 is slidably engageable with the outside of the temperature-compensating package 374, The end cap 356 is hermetically coupled to the outside of the temperature-compensating package 374 using an adhesive, such as, for example EP 62-1 available from Master Bond, Inc. of Hackensack, N.J., U.S.A. It will be apparent to those of ordinary skill in the art of packaging optical fiber devices that modifications and variations can be made to the means of coupling the end cap 356 to the outside of the temperature-compensating package 374 such as, for example, brazing, soldering and welding.

The end cap 356 includes a hole 358. Preferably, the diameter of the hole 358 is about 0.011 inch (0.028 cm) when the optical fiber device 372 has a diameter of about 125 μm. Preferably, the hole 358 is aligned with the holes 308, 322 in the temperature-compensating package 374. The optical fiber device 372 is coupled to the sides 360 of the hole 358, forming a hermetic seal. The hole 360 is from about 1 mm to about 3 mm in length. The optical fiber device 372 may be coupled to the sides 360 of the hole 358 using an adhesive, such as, for example EP 62-1 available from Master Bond, Inc. of Hackensack, N.J., U.S.A. It will be apparent to those of ordinary skill in the art of packaging optical fiber devices that modifications and variations can be made to the means of coupling the optical fiber device 372 is coupled to the sides 360 of the hole 358 such as, for example metallizing a region of the optical fiber device 372 and soldering the two together.

The hermetic coupling of the end cap 356 to the temperature-compensating package 374 results in a hermetically sealed cavity 362. The optical device region 390 is centered between the two surfaces 306, 320. The effective coefficient of thermal expansion of the temperature-compensating package 374 is determined using equation 1 by substituting $K_1$, $K_2$, $K_3$ and $K_{AB}$ from FIG. 15 for $L_1$, $L_2$, $L_3$, $L_{AB}$ respectively.

Figure 16:
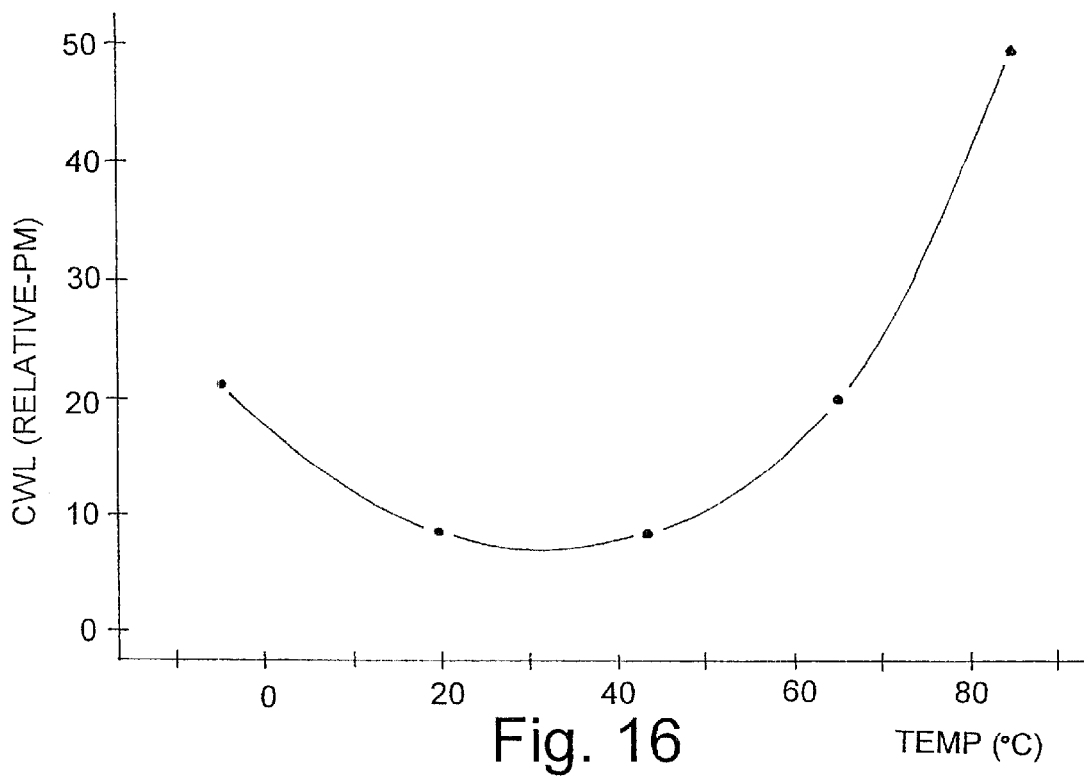
FIG. 16 illustrates the typical temperature response of a fiber Bragg grating packaged in a device constructed from 304 stainless steel and Invar® alloy.

FIG. 16 illustrates the typical response of a fiber Bragg grating packaged in a device with a substantially constant coefficient of thermal expansion. The characteristic parabolic response of the center wavelength verses temperature has a depth, in this case of about 40 μm over the range of −5 to 85° C.

Figure 17:
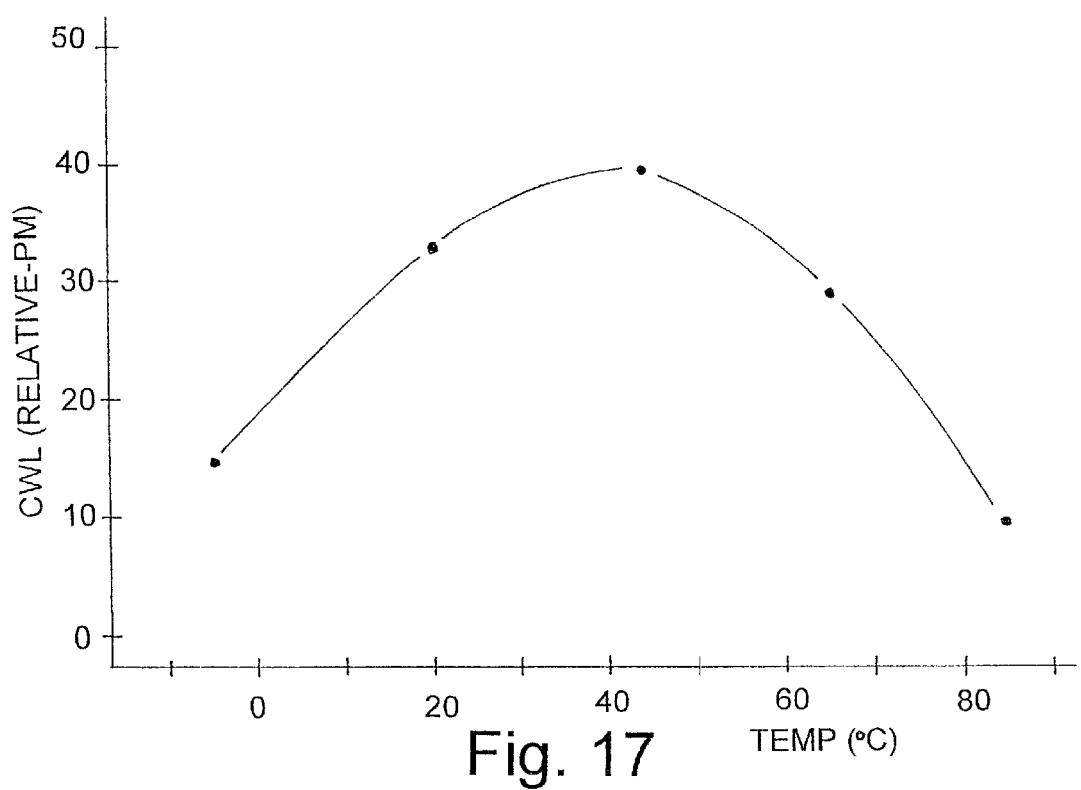
FIG. 17 shows the temperature response of a device constructed from 304 stainless steel and Alloy 42.

FIG. 17 shows the response of a device constructed from 304 stainless steel and Alloy 42. In this configuration the coefficient of thermal expansion of the device is linear but falls off too rapidly with temperature and the non-linear component in the center wavelength response is overcompensated producing an inverted parabolic response.

Figure 18:
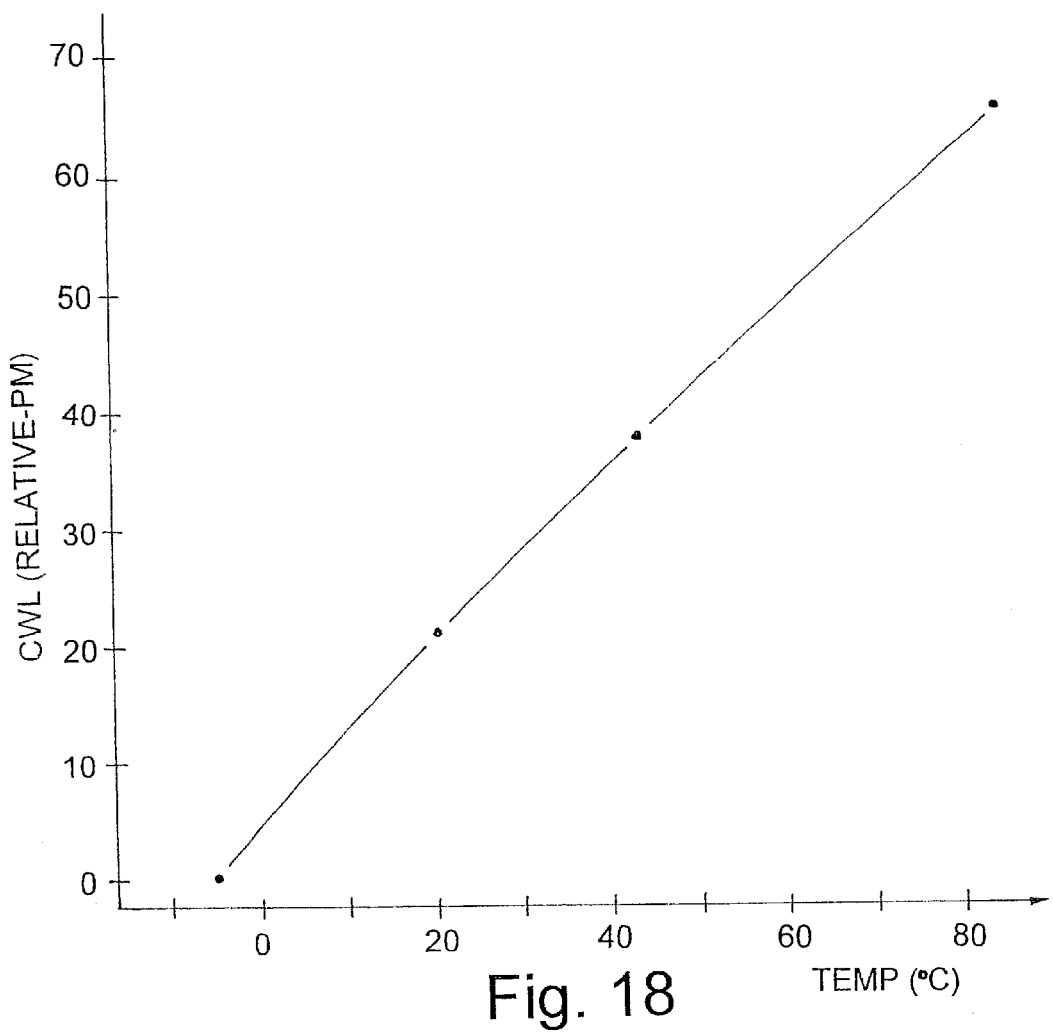
FIG. 18 shows the temperature response of a device having an outer sleeve made of Alloy 42, a middle sleeve made of 309 stainless steel, and an inner sleeve made of Invar®.

FIG. 18 shows the response of a device constructed from Alloy 42 outer sleeve, a 309 stainless steel mid sleeve, and an Invar® inner sleeve. This produces the desired substantially linear response in center wavelength but the slope is positive. The fiber Bragg grating is generally undercompensated by about 10% over the temperature range from −40 to 85° C. The device has a coefficient of thermal expansion which decreases with temperature but is not negative enough to fully compensate.

Figure 19:
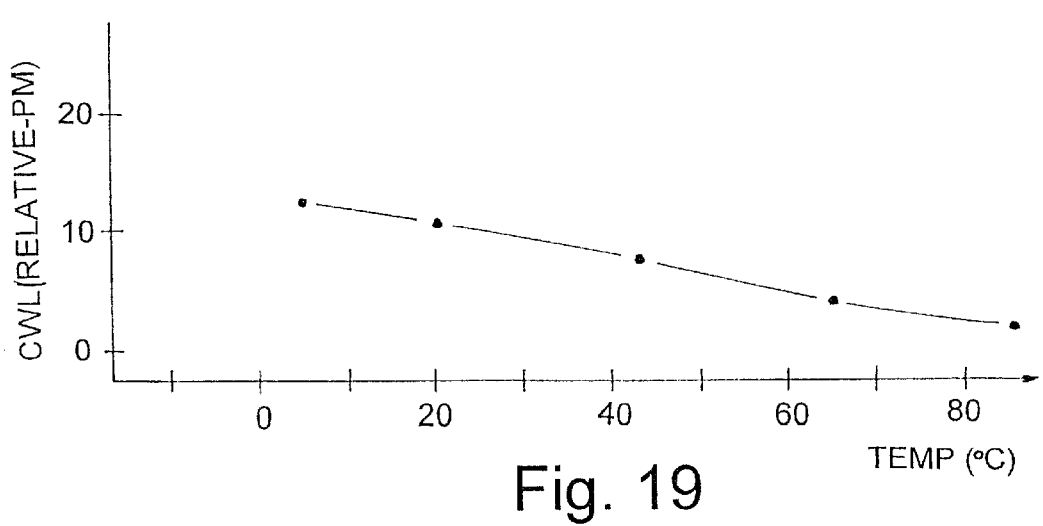
FIG. 19 shows the temperature response of a device of the same construction as FIG. 18 but with the lengths adjusted to produce a flatter response.

FIG. 19 shows the response of a device of the same construction as FIG. 18 but with the lengths adjusted. It produces a flatter response, substantially linear. The center wavelength thermal response of the fiber is compensated to within about 1% of total compensation in this instance.

The foregoing description of the invention has been presented for purposes of illustration and description. It is not intended to be exhaustive or to limit the invention to the precise form disclosed, and modifications and variations are possible in light of the above teachings or may be acquired from practice of the invention. The drawings and description were chosen in order to explain the principles of the invention and its practical application. It is intended that the scope of the invention be defined by the claims appended hereto, and their equivalents.

The invention claimed is:

1. A temperature-compensated optical fiber grating, comprising:

an optical grating contained in an elongated section of an optical fiber; and a temperature-compensating structure including a plurality of temperature-compensating members connected together; a first temperature-compensating member connected to the optical fiber at a first point spaced away from one end of the fiber grating, a second temperature-compensating member connected to the optical fiber at a second point spaced away from another end of the fiber grating, at least one of the temperature-compensating members having a coefficient of thermal expansion that decreases with increasing temperature and which is lower than the coefficient of thermal expansion of at least one other temperature-compensating member, the temperature-compensating members arranged to have an effective coefficient of thermal expansion that is negative whereby the tensile strain on the portion of the optical fiber containing the fiber grating is reduced when the temperature is increased and the tensile strain on the portion of the optical fiber containing the fiber grating is increased when the temperature is decreased.

2. The temperature-compensated optical fiber grating of claim 1, wherein the temperature-compensating member having a coefficient of thermal expansion that decreases with increasing temperature is made of Alloy 42.

3. The temperature-compensated optical fiber grating of claim 1, wherein the temperature-compensating member having a coefficient of thermal expansion that decreases with increasing temperature is made of Kovar®.

4. The temperature-compensated optical fiber grating of claim 2, wherein at least another of the temperature-compensating members is 309 stainless steel.

5. The temperature-compensated optical fiber grating of claim 3, wherein at least another of the temperature-compensating members is 309 stainless steel.

6. The temperature-compensated optical fiber grating of claim 1, wherein the temperature-compensating structure comprises two juxtaposed members.

7. The temperature-compensated optical fiber grating of claim 6, wherein the juxtaposed temperature-compensating members are concentric tubes.

8. The temperature-compensated optical fiber grating of claim 1, wherein the temperature-compensating structure consists of three juxtaposed members.

9. The temperature-compensated optical fiber grating of claim 8, wherein the three juxtaposed members are concentric tubes.

10. The temperature-compensated optical fiber grating of claim 9, wherein at least one of the members is made of Alloy 42.

11. The temperature-compensated optical fiber grating of claim 8, wherein at least one of the members is made of Kovar®.

12. The temperature-compensated optical fiber grating of claim 1, wherein the optical fiber grating is a fiber Bragg grating.

13. The temperature-compensated optical fiber grating of claim 1, wherein the optical fiber grating is a long-period grating.

14. A temperature-compensated optical fiber grating, comprising:
an optical grating contained in an elongated section of an optical fiber; and
a temperature-compensating structure including a plurality of temperature-compensating members connected together, a first temperature-compensating member connected to the optical fiber at a first point spaced away from one end of the fiber grating, a second temperature-compensating member connected to the optical fiber at a second point spaced away from another end of the fiber grating, the temperature-compensating members being selected and configured to provide a variable effective coefficient of thermal expansion that decreases with increasing temperature.

15. The temperature-compensated optical fiber grating of claim 14, wherein the effective coefficient of thermal expansion of the temperature-compensating structure varies from about $-60\times10^{-7}$° C.$^{-1}$ at $-40$° C. to about $-90\times10^{-7}$° C.$^{-1}$ at 85° C.

16. The temperature-compensated optical fiber grating of claim 14, wherein at least one of the temperature-compensating members has a coefficient of thermal expansion that decreases with increasing temperature and is less than $50\times10^{-1}$° C.$^{31\ 1}$ over the temperature range from $-40$° C. to 85° C., and at least one of the temperature-compensating members has a coefficient of thermal expansion that increases with increasing temperature and is greater than $100\times10^{-7}$° C.$^{-1}$ over the temperature range from $-40$ to 85° C.

17. The temperature-compensated optical fiber grating of claim 16, wherein the first temperature-compensating member is made of Kovar®.

18. The temperature-compensated optical fiber grating of claim 16, wherein the first temperature-compensating member is made of Alloy 42.

19. The temperature-compensated fiber grating of claim 17, wherein the second temperature-compensating member is made of 309 stainless steel.

20. The temperature-compensated fiber grating of claim 18, wherein the second temperature-compensating member is made of 309 stainless steel.

21. The temperature-compensated optical fiber grating of claim 16, wherein the temperature-compensating structure comprises two juxtaposed members.

22. The temperature-compensated optical fiber grating of claim 21, wherein the juxtaposed temperature-compensating members are concentric tubes.

23. The temperature-compensated optical fiber grating of claim 16, wherein the temperature-compensating structure consists of three juxtaposed members.

24. The temperature-compensated optical fiber grating of claim 23, wherein a first of the three juxtaposed members is made of Alloy 42, a second of the three juxtaposed members is made of 309 stainless steel, and a third of the three juxtaposed members is made of Invar®.

25. A temperature-compensated optical fiber grating, comprising:
an optical grating contained in an elongated section of an optical fiber; and
a temperature-compensating structure including a plurality of temperature-compensating members connected together, a first temperature-compensating member connected to the optical fiber at a first point spaced away from one end of the fiber grating, a second temperature-compensating member connected to the optical fiber at a second point spaced away from another end of the fiber grating, at least one of said temperature-compensating members being made Invar®, and at least one other of the members being made of Alloy 42.

26. The temperature-compensated optical fiber grating of claim 25, wherein the temperature-compensating structure consists of three juxtaposed members, including the Invar® member, the Alloy 42 member, and a member made of 309 stainless steel.

27. The temperature-compensated optical fiber grating of claim 26, wherein the three juxtaposed members are concentric tubes.

28. A method of temperature-compensating an optical grating contained in an elongated section of an optical fiber, comprising:
providing an optical grating contained in an elongated section of an optical fiber; and
attaching the section of the optical fiber containing the optical grating to a temperature-compensating structure including a plurality of temperature-compensating members connected together, wherein a first temperature-compensating member is connected to the optical fiber at a first point spaced away from one end of the fiber grating, a second temperature-compensating member is connected to the optical fiber at a second point spaced away from another end of the fiber grating, at least one of the temperature-compensating members having a coefficient of thermal expansion that decreases with increasing temperature and which is lower than the coefficient of thermal expansion of at least one other temperature-compensating member, the temperature-compensating members arranged to have an effective coefficient of thermal expansion that is negative whereby the tensile strain on the portion of the optical fiber containing the fiber grating is reduced when the temperature is increased and the tensile strain on the portion of the optical fiber containing the fiber grating is increased when the temperature is decreased.

29. The method of claim 28, wherein the temperature-compensating member having a coefficient of thermal expansion that decreases with increasing temperature is made of Alloy 42.

30. The method of claim 28, wherein the temperature-compensating member having a coefficient of thermal expansion that decreases with increasing temperature is made of Kovar®.

31. The method of claim 29, wherein at least another of the temperature-compensating members is 309 stainless steel.

32. The method of claim 30, wherein at least another of the temperature-compensating members is 309 stainless steel.

33. The method of claim 28, wherein the temperature-compensating structure comprises two juxtaposed members.

34. The method of claim 33, wherein the juxtaposed temperature-compensating members are concentric tubes.

35. The method of claim 28, wherein the temperature-compensating structure consists of three juxtaposed members.

36. The method of claim 35, wherein the three juxtaposed members are concentric tubes.

37. The method of claim 36, wherein at least one of the members is made of Alloy 42.

38. The method of claim 36, wherein at least one of the members is made of Kovar®.

39. The method of claim 28, wherein the optical fiber grating is a fiber Bragg grating.

40. The method of claim 28, wherein the optical fiber grating is a long-period grating.

* * * * *